US007965257B2

(12) United States Patent
Perkins et al.

(10) Patent No.: US 7,965,257 B2
(45) Date of Patent: Jun. 21, 2011

(54) CONFIGURABLE IMAGING SYSTEM

(75) Inventors: Michael Perkins, Kitchener (CA); Robert Rushby, Cambridge (CA)

(73) Assignee: Christie Digital Systems USA, Inc., Cypress, CA (US)

( * ) Notice: Subject to any disclaimer, the term of this patent is extended or adjusted under 35 U.S.C. 154(b) by 477 days.

(21) Appl. No.: 12/119,191

(22) Filed: May 12, 2008

(65) Prior Publication Data
US 2008/0285087 A1    Nov. 20, 2008

Related U.S. Application Data

(63) Continuation-in-part of application No. 11/748,255, filed on May 14, 2007.

(51) Int. Cl.
*G09G 5/00* (2006.01)
(52) U.S. Cl. ........................................................ 345/1.3
(58) Field of Classification Search .............. 345/1.1–3.4
See application file for complete search history.

(56) References Cited

U.S. PATENT DOCUMENTS

| | | | |
|---|---|---|---|
| 4,974,073 A | 11/1990 | Inova | |
| 5,136,390 A | 8/1992 | Inova | |
| 5,767,818 A * | 6/1998 | Nishida | 345/1.1 |
| 6,081,375 A | 6/2000 | Furuya et al. | |
| 6,115,022 A | 9/2000 | Mayer, III et al. | |
| 6,219,011 B1 | 4/2001 | Aloni et al. | |
| 6,335,829 B1 | 1/2002 | Van De Voorde | |
| 6,501,441 B1 | 12/2002 | Ludtke et al. | |
| 6,550,521 B1 | 4/2003 | McNabb | |
| 6,760,075 B2 | 7/2004 | Mayer, III et al. | |
| 6,771,307 B2 | 8/2004 | Waki et al. | |
| 6,791,513 B2 | 9/2004 | Ogino et al. | |
| 6,799,836 B2 | 10/2004 | Silverbrook | |
| 6,956,541 B2 * | 10/2005 | McClintock | 345/1.1 |
| 7,248,229 B2 * | 7/2007 | Zerphy et al. | 345/1.3 |
| 2001/0026326 A1 | 10/2001 | Itaki et al. | |
| 2005/0018040 A1 | 1/2005 | Buchner et al. | |
| 2005/0219467 A1 | 10/2005 | Nomizo et al. | |

FOREIGN PATENT DOCUMENTS

| | | |
|---|---|---|
| DE | 4006189 | 9/1991 |
| JP | 8-88820 | 4/1996 |
| JP | 2000-276099 | 10/2000 |
| JP | 2002-162689 | 6/2002 |
| WO | 99/13377 | 3/1999 |
| WO | 99/29117 | 6/1999 |

(Continued)

OTHER PUBLICATIONS

Ezekiel S. Bhasker, et al., "Asynchronous Distributed Calibration for Scalable and Reconfigurable Multi-Projector Displays", IEEE Transactions on Visualization and Computer Graphics, IEEE Service Center, Los Alamitos, CA, vol. 12, No. 5, Sep. 1, 2006, pp. 1101-1108.

(Continued)

*Primary Examiner* — Stephen G Sherman
(74) *Attorney, Agent, or Firm* — Staas & Halsey LLP

(57) ABSTRACT

An imaging system, comprising an image source and a plurality of microtile units for generating respective portions of an image, each microtile unit including a plurality of coupling mechanisms for connection to a plurality of other microtile units such that the microtile units may be arranged in multiple geometrical configurations, and each microtile unit including circuitry for communication with the other microtile units to control generation of each respective portion of the image.

51 Claims, 14 Drawing Sheets

FOREIGN PATENT DOCUMENTS

| WO | WO 00/18138 | 3/2000 |
| WO | WO 00/18139 | 3/2000 |
| WO | 2006/115852 | 11/2006 |

OTHER PUBLICATIONS

European Search Report issued on Oct. 20, 2008 in corresponding European Patent Application No. 08 25 1680.

U.S. Office Action mailed May 26, 2010 in related U.S. Appl. No. 11/748,255.

European Search Report mailed Oct. 26, 2009 in corresponding European Patent Application 09009079.6.

U.S. Notice of Allowance mailed Oct. 19, 2010 in corresponding U.S. Appl. No. 11/748,255.

U.S. Notice of Allowance mailed Nov. 19, 2010 in corresponding U.S. Appl. No. 12/183,653.

U.S. Office Action mailed Sep. 29, 2010 in corresponding U.S. Appl. No. 12/183,653.

U.S. Office Action mailed May 26, 2010 in corresponding U.S. Appl. No. 11/748,255.

U.S. Restriction Requirement mailed Mar. 23, 2010 in corresponding U.S. Appl. No. 11/748,255.

U.S. Appl. No. 11/748,255, filed May 14, 2007, Michael Perkins, Christie Digital Systems USA, Inc.

U.S. Appl. No. 12/183,653, filed Jul. 31, 2008, Michael Perkins, Christie Digital Systems USA, Inc.

\* cited by examiner

CONFIGURABLE IMAGING SYSTEM

CROSS-REFERENCE TO RELATED APPLICATION

This is a continuation-in-part of application Ser. No. 11/748,255, filed May 14, 2007.

FIELD

The following is directed in general to imaging systems, and more particularly to an imaging system having a plurality of microtile units for generating respective portions of a composite image.

BACKGROUND

A large number of applications and potential applications exist for imaging systems such as projection displays that are used to display information. Such applications include, but are not limited to, general indoor signage (e.g. shopping malls, arcades, etc.), transportation signage (e.g. arrival/departure times, etc.), in-lobby signage for office buildings, control rooms, restaurants signage, etc.

The currently prevailing paradigm in the projection display industry is that improvement must be based on higher light power (lumens) at higher resolutions and progressively lower cost. This paradigm is based on the concept that higher resolution and higher power are necessary to develop larger displays with acceptable image quality and brightness using a least number of projectors. This paradigm has served the industry well, but has a number of drawbacks which include: the significant cost associated with higher resolutions, limitations in projector resolution due to light valve/panel design, increased weight, increased cost and increased noise levels associated with cooling systems necessary to accommodate high power illumination.

Moreover, the currently prevailing paradigm is based on static size and configuration of displays. Thus, whereas it is known to provide large displays by assembling a multiplicity of small displays in an array (see, for example, WO 2006/115852 (Ostendo)), there is no provision for creating customized shapes and dimensions of display from such multiple small displays.

SUMMARY

According to an aspect of this specification, an imaging system is set forth having a plurality of small projection devices (referred to herein as 'microtile' units) for generating respective portions of a composite image. Each microtile unit includes coupling mechanisms for connection to at least one other microtile unit such that the microtile units may be arranged in multiple geometrical configurations of various sizes. In another aspect, the microtile units include functionality to 'self-organize' the distribution of command signals and content over arrays of microtile units of arbitrary shape and size. The term "array" is used broadly in this specification to mean any arrangement of interconnected microtile units, and is not limited to a rectangular configuration of plural microtile units.

The imaging system set forth herein below establishes a new paradigm wherein improvement in brightness is achieved without increased power requirements (e.g. the increase is in the order of nits rather than lumens), at a required pixel pitch (pixels per mm) rather than increased resolution, and at very low cost.

The imaging system set forth herein results in a new paradigm that uses low resolution (inexpensive) panels with low power illumination in order to achieve very low cost projection displays. The microtile units set forth herein are reusable and configurable to enable low cost displays of almost any size and shape, without sacrificing image quality and brightness.

Additional aspects and advantages will be apparent to a person of ordinary skill in the art, residing in the details of construction and operation as more fully hereinafter described and claimed, reference being had to the accompanying drawings.

BRIEF DESCRIPTION OF THE DRAWINGS

A detailed description of the preferred embodiment is set forth in detail below, with reference to the following drawings, in which:

FIG. 4 depicts grid microtile units according to a second embodiment of the invention, wherein

DETAILED DESCRIPTION

Figure 1:
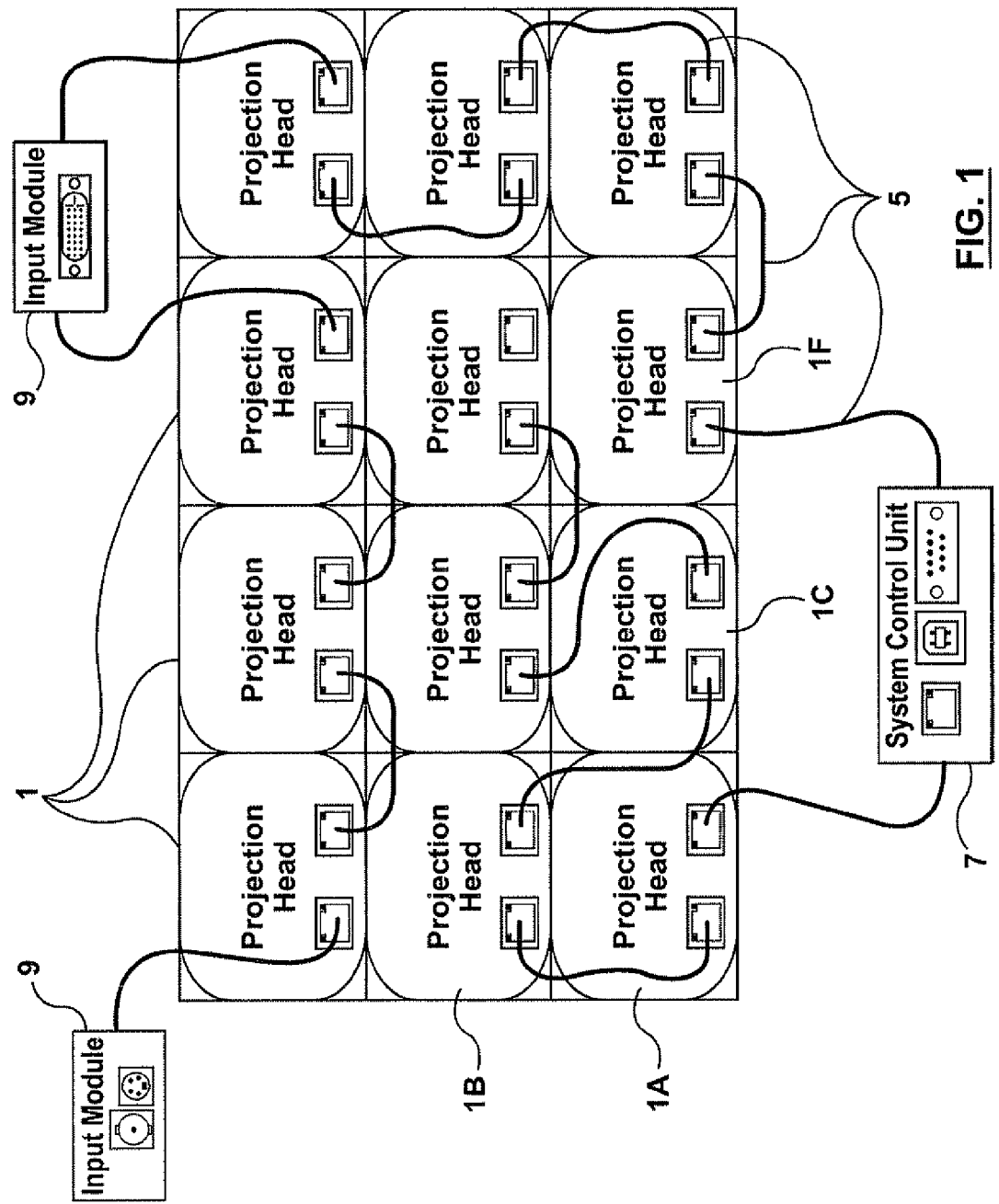
FIG. 1 is a block diagram of an exemplary imaging system comprising a plurality of microtile units, according one embodiment of the invention.

In FIG. 1, an exemplary imaging system is shown comprising a plurality of series connected microtile units or projection heads 1 assembled to form an array. Cables 5 are used to connect the microtile units 1 in any sequence. According to one embodiment standard CAT 5 cabling is used having four twisted wire pairs for data and command message transmission, wherein command messages are embedded in the blanking interval of a video data stream. Data transmission preferably occurs at a rate of about 5 Gpbs.

Each microtile unit 1 contains a light engine and circuitry (including, for example, a microprocessor, RAM frame buffer and video processing to provide image capture, resizing, color matching, edge blending, etc.), discussed in greater detail below with reference to FIGS. 7 and 8. Data received from an adjacent microtile unit 1 via cable 5 is buffered and retransmitted to the next series-connected microtile unit 1 (or system control unit 7 or input module 9). The video processing circuitry preferably includes modules for sub-image capture and resizing, color matching, edge blending, uniformity correction and 2D keystoning. Also, as discussed in greater detail below with reference to FIGS. 6A and 6B, color, brightness and image uniformity may be achieved using intelligent self-alignment of images between microtile units 1 and intelligent brightness and color control.

At least one system control and power unit 7 is connected to an available port on one of the microtile units 1 for providing power (e.g. 48 V DC) and to facilitate automatic detection of the configuration of interconnected microtile units 1, as described in greater detail below. Typically, the system control and power unit 7 includes at least one Ethernet, USB and/or infrared port to a user interface (not shown), and generates full frame static images (i.e. transfer image content from a SD (Secure Digital) flash card to a frame buffer for display), as well as implementing OSD (on-screen display) overlays (OSD allows the user to view and change display settings on-screen).

At least one input unit 9 is also connected to an available port on one of the microtile units 1 for providing a video and/or image source for display by the microtile units 1. Preferably, the input unit 9 performs video processing, such as de-interlacing, scaling, frame rate conversion, etc.

Each microtile unit 1 requires electronic communication only with adjacent microtile units (or input unit(s) 9 or the system control unit 7, any of which can be connected anywhere in the chain of series-connected microtile units 1), provided that an electronic signal path from the system control and power unit 7 and input units 9 extends via respective microtile units 1 and associated cables 5 to each microtile unit 1.

As discussed in greater detail below, with reference to FIGS. 2 and 3, a variety of different mechanical coupling mechanisms are possible for achieving accurate alignment of each microtile unit 1 with respect to its adjacent interconnected microtile units 1.

Figure 2:
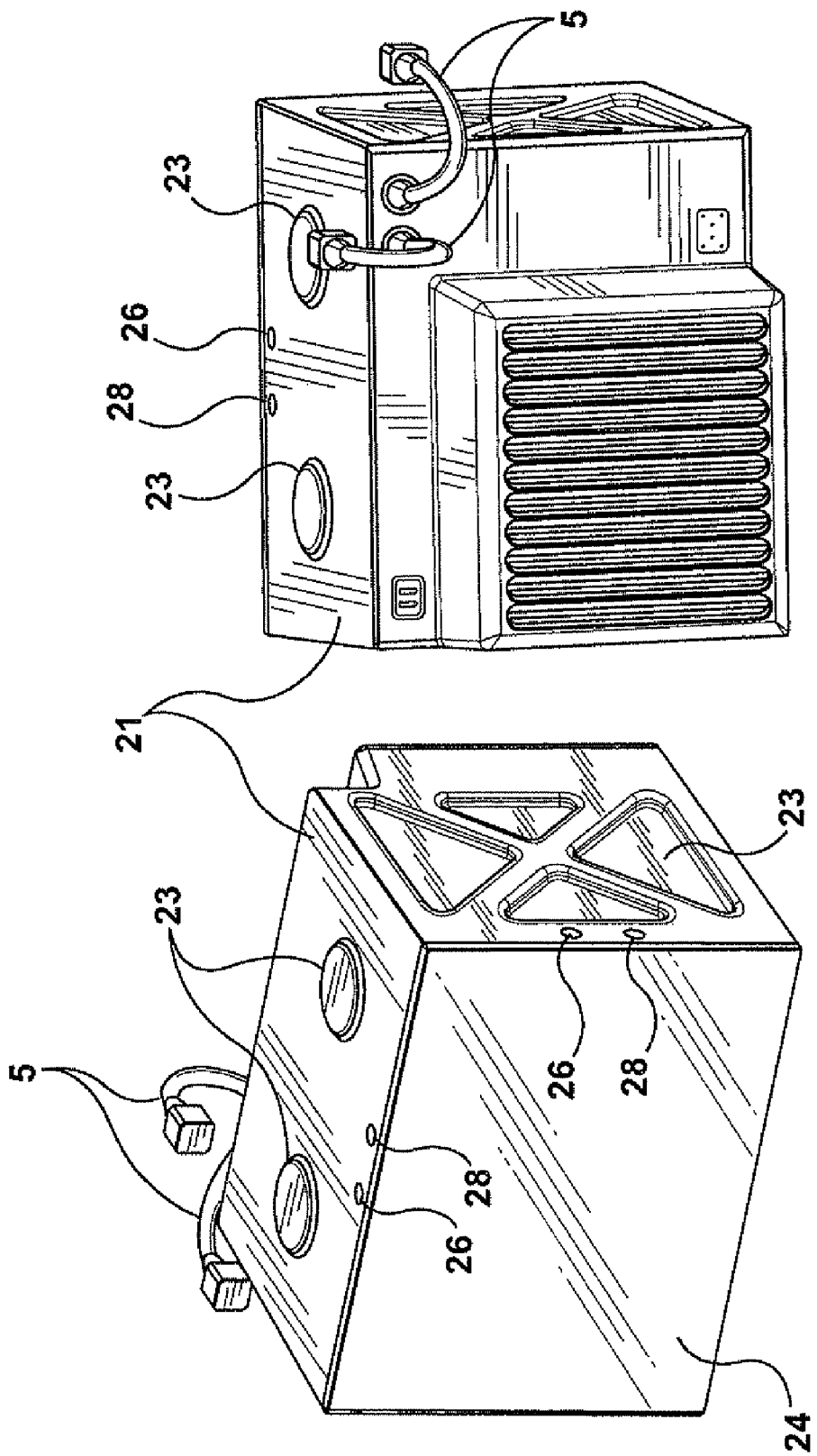
FIG. 2 depicts front and rear perspective views of a pair of block microtile units.

According to one embodiment, the microtile units are in the form of "block" microtile units 21, as shown in FIG. 2. Coupling mechanisms 23 permit registration or alignment of a microtile unit 21 with other microtile units based on the shapes of protrusions on respective side surfaces of each microtile unit. The front surface of each microtile unit 21 comprises a self-contained screen 24. A small rear projector (including light source, light valve, optics and associated electronics) is provided within each microtile unit 21 for projecting an image on screen 24. According to an exemplary embodiment, the light source is implemented using LEDs, although it is contemplated that lasers or other light sources may be utilized, the selection and implementation of which would be known to a person of ordinary skill in the art.

A pair of LEDs 26 and Photodetectors 28 is provided on each of the top, bottom, left and right surfaces, to permit of self-organizing and configuring of the microtile units 1, as discussed in greater detail below.

Figure 3B:
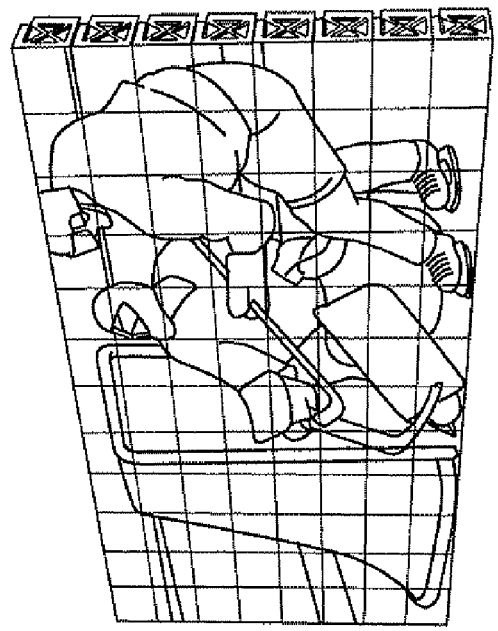
FIGS. 3A and 3B depict exemplary configurations of microtile units to create a composite image.
Figure 3A:
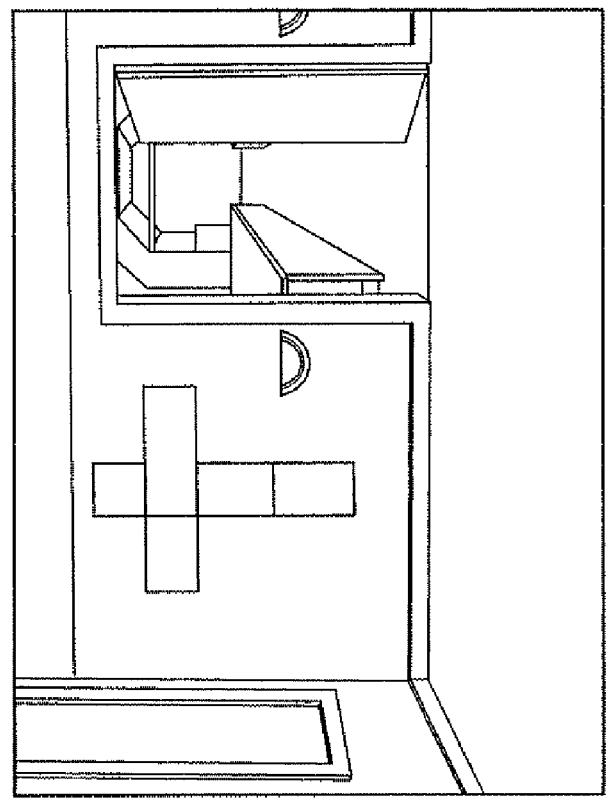

Also discussed in greater detail below, each microtile unit 21 projects a portion of a composite image (preferably at SVGA resolution to enable small pixel pitch (under 1 mm)), as shown in FIGS. 3A and 3B. It will be noted that microtile units 21 are not required to be arranged in rectangular configurations, thereby resulting in significant flexibility in terms of display design (FIG. 3A).

According to a successful prototype, each block microtile 21 has a diagonal dimension of approximately 400 mm for projecting an image having a 4:3 aspect ratio, although other dimensions and aspect ratios are contemplated. However, a person skilled in the art will appreciate that a range of display sizes and shapes may be accommodated. For an indoor display, such as shown in FIG. 3A, it is contemplated that 500 nits of brightness will be sufficient, although other brightness may be provided depending on the illumination source, optical design and screen size.

Figure 4A:
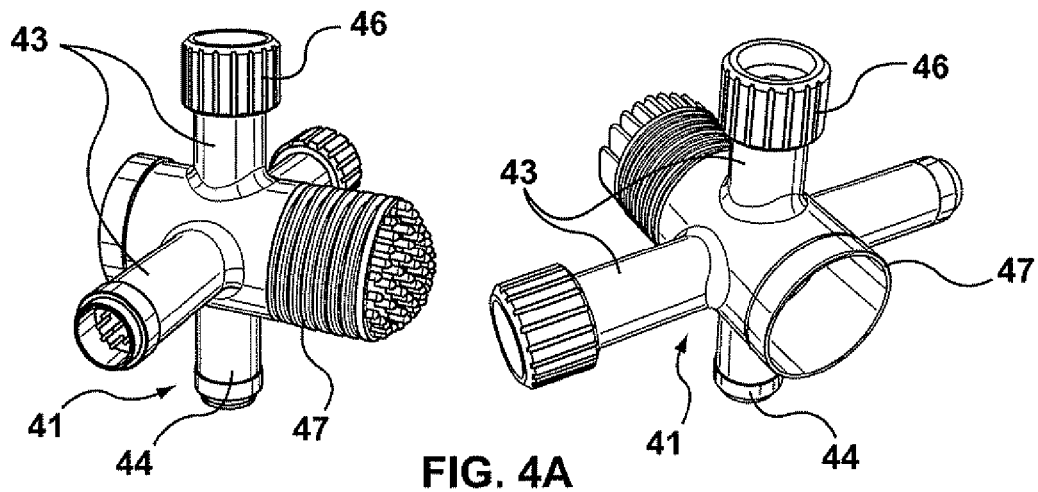
FIG. 4A shows front and rear views of a grid microtile unit.
Figure 4B:
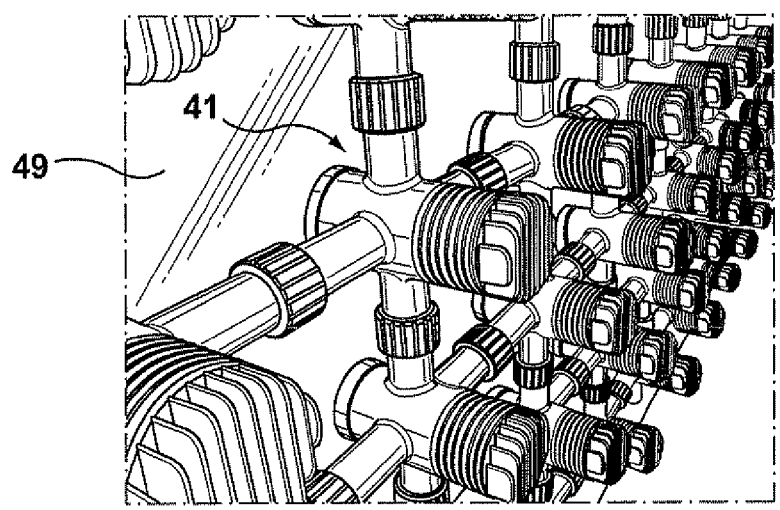
FIG. 4B shows an array of grid microtile units for displaying a composite image on the rear of a display screen.
Figure 4C:
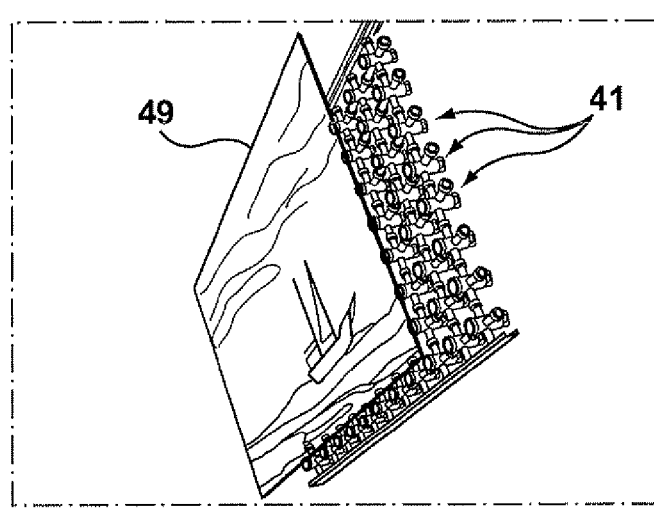
FIG. 4C is a front view of the array and screen of FIG. 4B

Turning to FIG. 4A, an embodiment of a "grid" microtile unit 41 is set forth capable of connection with other grid microtile units as shown in FIGS. 4B and 4C. The grid microtile units 41 are similar in functionality to the block microtile units 21 of FIG. 2. However, there is no self-contained screen in the grid microtile unit 41. Tubular coupling mechanisms 43 permit interconnection between adjacent microtile units 41 via complementary threaded male portions 44 and female coupling sleeves 46. A small rear projector 47 (including light source, light valve, optics and associated electronics) is provided within each microtile unit 41 for projecting an image onto a remote screen (such as screen 49 depicted in FIGS. 4B and 4C). As discussed above, each microtile unit 41 projects a portion of a composite image onto the remote screen 49. FIGS. 4B and 4C show an array of interconnected grid microtiles 41 projecting an image onto screen 49 (wherein FIG. 4B is a view showing projection onto the rear surface of the screen whereas FIG. 4C shows the image as displayed on the front surface of the screen).

Figure 5:
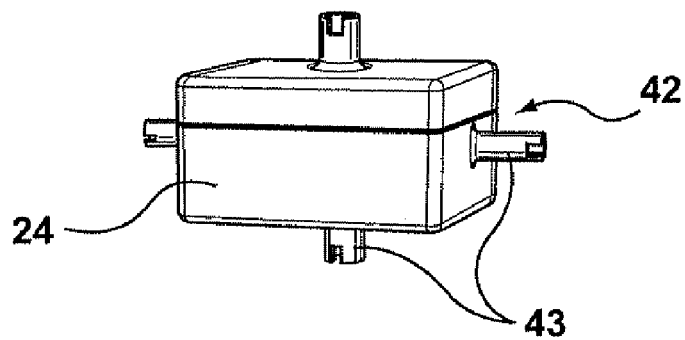
FIG. 5 shows an alternative embodiment of grid microtile unit.

FIG. 5 shows yet a further alternative embodiment of microtile unit 42 which is in the shape of a block incorporating a light engine and circuitry and a front surface comprising a self-contained screen 24 like the block microtile units 21, but which includes tubular coupling mechanisms 43, as in the grid microtile embodiment of FIG. 4. Numerous other configurations may also be adopted.

As discussed briefly above, self-alignment of images across successive adjacent microtile units may be accomplished by electronic adjustment of the image upwardly, downwardly, right, left, via roll, pitch and yaw. This dramatically reduces or eliminates the need for expensive mechanical adjustments and provides for simple correction of zoom errors.

Figure 6A:
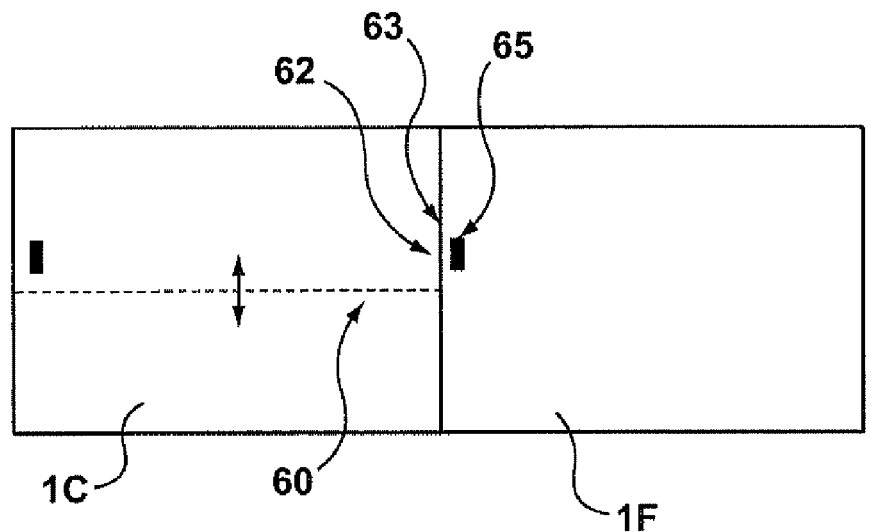
FIGS. 6A and 6B are front and perspective views, respectively, showing a feature of the block microtile unit for effecting self-alignment of images across successive adjacent microtile units.
Figure 6B:
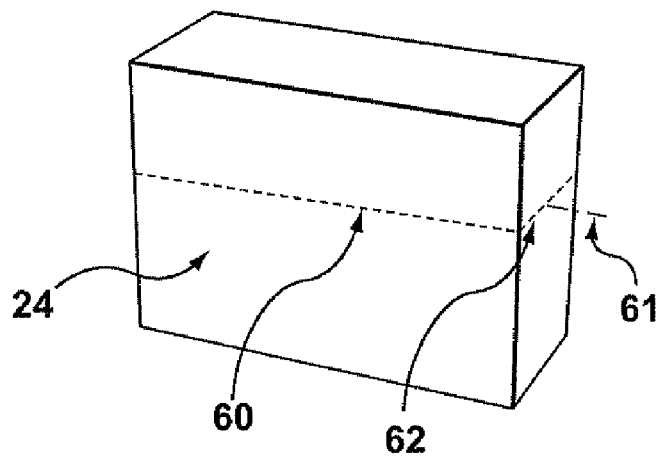

One such alignment process (for use with block microtile units 21) requires slightly over-scanning the screen 24 so that a small portion of the edge of each image (e.g. line 60) spills over onto a side wall of the microtile unit, as shown in FIGS. 6A and 6B, such that light spills (e.g. at 61) through a pinhole 62 therein, and is detected by a sensor 63 disposed in a small opening 65 in the adjacent screen. By controlling the image content in the overspill area, the sensor 63 detects when the image is aligned properly. Using several of these pinhole/sensor pairs, keystoning can be sensed and adjusted for. By sensing the color intensity of the light spilling through the pinhole 62, the system can automatically adjust for consistent intensity and colour. Alternatively, it is contemplated that the sensors may be placed in the same cabinet as the projection system and only self-align within the block itself.

Another alignment process (for use with grid microtile units), requires overlapping the image portions projected by successive microtile units onto the screen 49, and using known edge blend techniques to eliminate perceived borders between the image portions. Examples of such edge blend techniques are described in U.S. Pat. No. 4,974,073 entitled "Seamless Video Display"; U.S. Pat. No. 5,136,390 entitled "Adjustable Multiple Image Display Smoothing Method and Apparatus"; U.S. Pat. No. 6,115,022 entitled "Method and Apparatus for Adjusting Multiple Projected Raster Images and U.S. Pat. No. 6,760,075 entitled "Method and Apparatus for Seamless Integration of Multiple Video Projectors".

Image uniformity may be achieved through careful optical design and through electronic image adjustment, as well as through screen design (with careful consideration to viewing angles, contrast and related issues). Careful consideration of these factors is important to achieving a pleasing multi-tiled display while avoiding 'hot-spots', minimizing reflections from ambient light and unpleasant screen-to screen-variation. 'Optical' screen designs may be used to achieve this (i.e. a single element or multiple element rear-projection screen that is designed to achieve a predefined optical function, for example: to control the light path as to enhance the quality of the display images for optimum viewing conditions).

According to an important aspect of the invention, the array of microtile units 1 self-organizes based on the number and configuration of the microtile units. One exemplary method of self-organizing and configuring is implemented under control of the system control unit 7, although it is contemplated that self-organizing and configuring may also be performed as a distributed process among the interconnected microtile units 1.

The exemplary method of self-organizing and configuring of microtile units 1 comprises three phases: Address Assignment; Module Identification; and Array Mapping. Once these three phases are complete, the system controller unit 7 contains a complete map of the interconnected microtile units 1 for the purpose of distributing command signals and image content over the entire array in accordance with the detected shape and size of the array. The system control unit 7 initiates the self organization process as part of the power-up procedure. Preferably, the input modules 9 and microtiles units 1 support hot plugging, so that a user interface option may be provided to rerun the self organization process on an as-required basis.

In the Address Assignment step, the system control unit 7 issues an "AUTOADDRESS 1" command to the first 'left-ward' module 1 to which it is connected in the series-connected 'chain' of units (i.e. the unit 1A in FIG. 1). The receiving unit 1A responds by setting its internal address to "1", and sends an "AUTOADDRESS 2" command to the next module (unit 1B) in the daisy chain connection (i.e. via the cable 5 connected to its output port). Unit 1B, upon receiving the "AUTOADDRESS 2" command sets its internal address to "2", and sends an "AUTOADDRESS 3" to unit 1C. Unit 1C in turn configures the next microtile unit in the chain, and so on. In this manner, all microtile units 1 (and any input modules 9 to the left of the system control unit 7) are assigned unique ID numbers.

During the Module Identification phase, the system control unit 7 determines what modules it is connected to by requesting the modules at addresses 1, 2, 3, etc., to identify themselves. As discussed above in the Address Assignment phase, each microtile unit 1A, 1B, etc. (and any connected input module 9) is programmed to return a unique identifying code. This allows the system control unit 7 to know what is connected at address 1, address 2, address 3, etc. When a request is met with no response, the system control unit 7 will know it has reached the end of the chain.

Once all items connected to the left of the system control unit 7 have been assigned an address and have been identified, the entire self-organization process is repeated for any units (microtile units 1 and/or input modules 9) to the right of the system control unit, where the first unit to the right (i.e. unit 1F in FIG. 1) is allocated the next sequential address.

The Array Mapping phase is used to establish the spatial relationship between all of the connected microtile units 1. As briefly discussed in connection with FIG. 2, an LED 26 and photodetector 28 pair is provided along each surface of a microtile unit 1. According to one embodiment of the Array Mapping phase, the LEDs 26 on the top and left side of each individual microtile unit 1, and photodetectors 28 along the bottom and right side of each microtile unit, are paired such that the photodetectors are sensitive to the wavelengths emitted by the LEDs. The placement of LEDs 26 and photodetectors 28 is such that the top and left LEDs of one microtile unit are aligned with photodetectors on adjacent microtile units to the top and left, respectively, such that only one photodetector 28 is capable of 'seeing' any given LED 26 within the array.

The LED 26 and photodetector 28 pairs may also be used for optically communicating video and command signals between respective modules 1, 7 and 9, as an alternative to serial data cables 5.

The Array Mapping phase starts with the system control unit 7 sending a command to microtile unit 1A to turn on its top surface LED 26. The system control unit 7 then queries all other microtile units 1 see which one is capable of detecting the illuminated LED (i.e. via an associated photodetector 28). Because of the alignment of LEDs and photodetectors discussed above, only one microtile unit 1 (or none) will respond in the affirmative. The system control unit 7 then knows which microtile unit (i.e. unit 1B) is directly above unit 1A. The system control unit 7 then commands microtile unit 1A to turn off its top LED 26 and illuminate its left-surface LED 26. Another query is sent by system control unit 7 to the array of microtile units in order to reveal the address of the unit immediately to the left of microtile unit 1A. If no microtile unit responds in the affirmative, then the system control unit 7 knows that there is no unit adjacent and to the left of unit 1A, and therefore a gap or a boundary has been located in the array. System control unit 7 then proceeds to repeat the process for unit 1B. By carrying out this procedure through the entire array, system control unit 7 builds a map indicating precisely how the array is physically configured. This information is then used by the system control unit 7 to determine the portion of the image each individual microtile unit is to be responsible for, and to relay that information to each microtile unit 1.

A person skilled in the art will appreciate that the Array Mapping phase does not need to be done with LEDs and photodetectors. For example, a set of electrical contacts could also be used (especially for the grid microtile embodiment of FIG. 4), or other similar physical detection may be used to establish which units are physically adjacent to each other.

Figure 7:
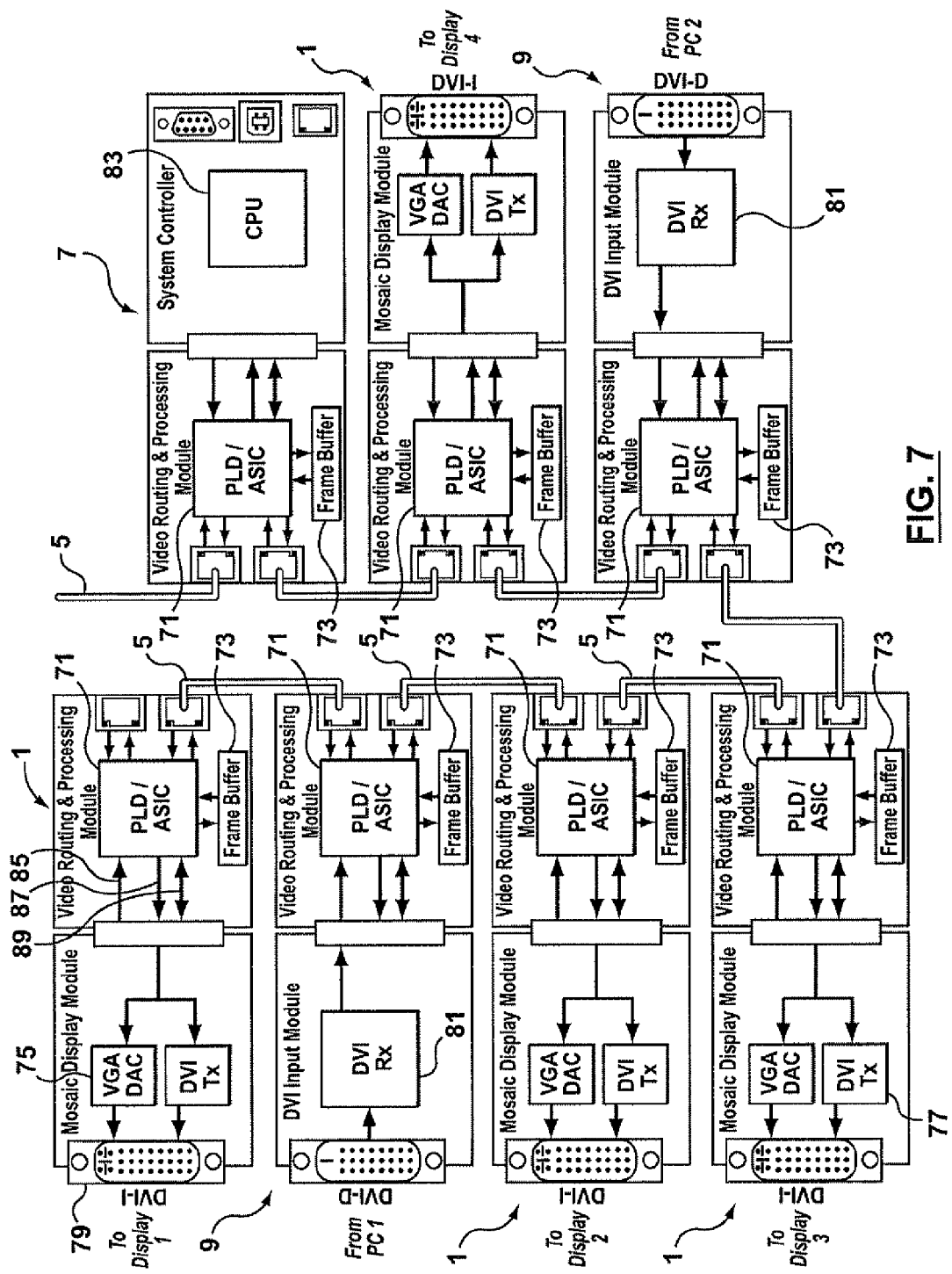
FIG. 7 is a block diagram showing an arrangement of microtile units, input modules and a system controller according to an exemplary embodiment.

Turning to FIG. 7, a block diagram is provided showing electronic components of an arrangement of microtile units 1, input modules 9 and a system controller 7 according to an exemplary embodiment. Each microtile unit 1, input module 9 and a system controller 7 incorporates a video routing and processing module comprising PLD/ASIC 71 and frame buffer 73, the details of which are set forth in FIG. 8, for receiving, transmitting and operating on video and command signals. The functional circuitry of each video routing and processing module is identical but operates on video and command signals in accordance with its 'personality' as a microtile unit 1, input module 9, or system controller 7. Thus, the video routing and processing module of each microtile unit 1 communicates with an associated mosaic display module comprising digital to analog converter (DAC) 75 and DVI transmitter 77 for transmitting video signals to an associated light engine via a OVI connector 79. Likewise, each input module 9 includes a DVI receiver 81 for receiving video signals from a source, such as a PC via a DVI connector 79, and each system controller 7 includes a CPU 83 for exchanging command/control messages with other units, via its video routing and processing module.

Video signals are input to the video routing and processing module via an input bus 85, and video signals are output therefrom via an output bus 87. CPU command signals are exchanged via a control bus 89.

Figure 8:
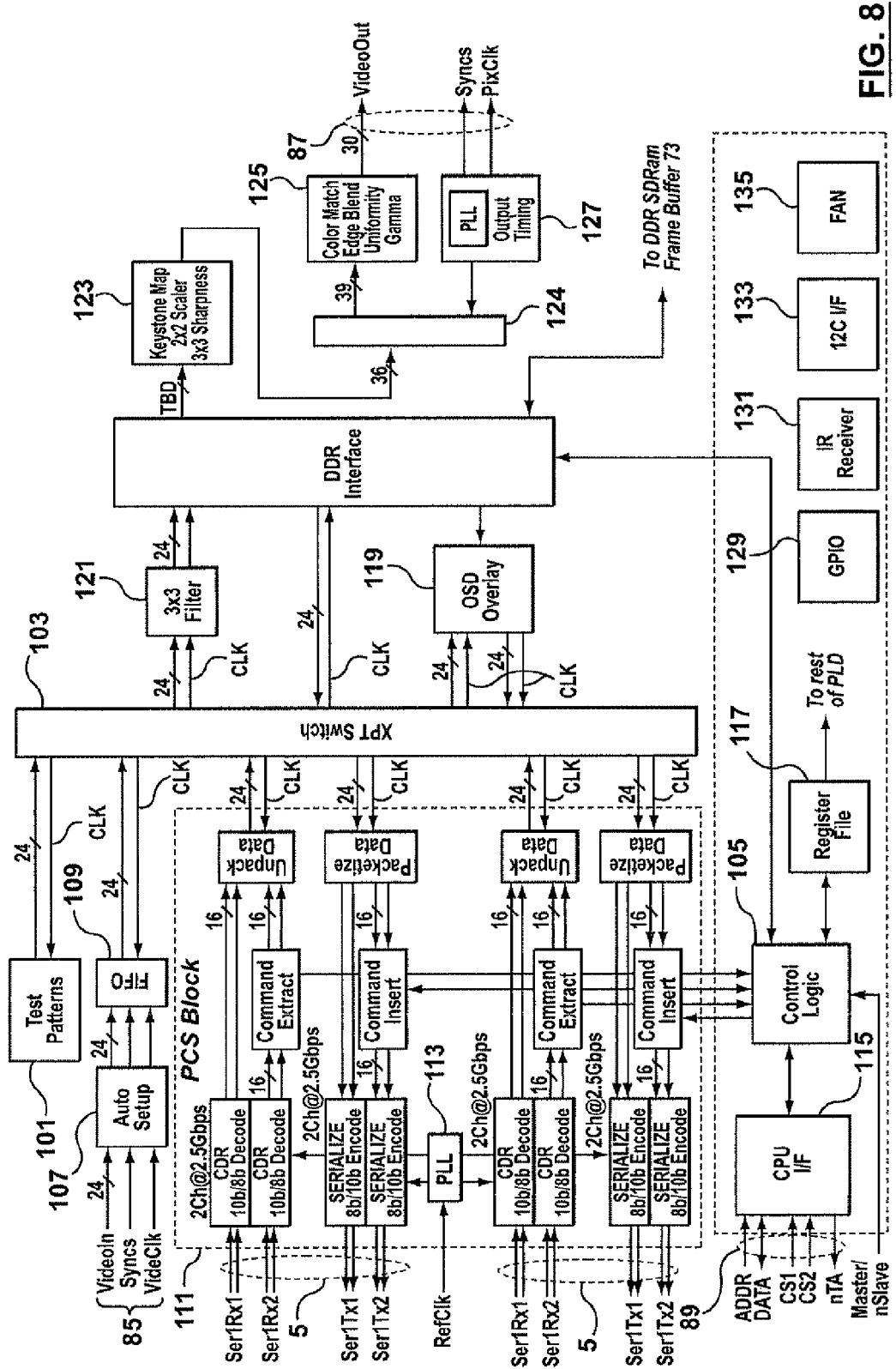
FIG. 8 is a block diagram showing internal circuitry of a video routing and processing module for an exemplary microtile unit according to the invention.

Turning to FIG. 8, details of an exemplary video routing and processing module are set forth. Test patterns block 101 is used to generate test images for testing interconnection of modules and as an aid in set up for image geometry correction, etc.

Crosspoint switch 103 functions as a multiplexer under control of control logic 105. Control logic 105 controls operation of the video routing and processing module in one of either a "master mode" or "slave mode", as discussed in greater detail below.

The auto setup block 107 receives input video signals from DVI receiver 81 via input bus 85, performs autodetection of the video format (e.g. VGA, XGA, etc.) and optimizes the video signal for display at an adjacent microtile unit 1. The video signal is loaded into a FIFO 109 for synchronizing the timing of the input video source to the internal processor clock (CLK), and output therefrom to the crosspoint switch 103. As an alternative, the functionality of auto setup block 107 may be incorporated directly into the DVI input module.

A PCS (Physical Coding Sublayer) block 111 provides an interface between the signals on cable's 5, the Crosspoint switch 103 and control logic 105. The PCS block 111 includes a pair of CDR (clock data recovery) decoder circuits and a pair of serialize encoder circuits for each serial cable 5. A PLL 113 (phase locked loop) is connected to each decode and encode circuit to provide proper synchronization of the multiple serial data streams. The lower CDR decoder circuit (Ser1Rx2 and Ser2Rx2) is, in turn, connected to a command extract block, while the lower serialize encoder circuits receives signals from a command insert block. Packetized data received from cable 5 is unpacked via an unpack data block before application to crosspoint switch 103. Conversely, signals received from crosspoint switch 103 are packetized in packetize data blocks for transmission via cable 5.

When operating in a "master mode", in which the video routing and processing module forms part of the control module 7, command data is extracted from the video blanking interval of video signals carried by cable 5 and inserted into the data stream (e.g. using 8B10B encoding) via the command extract and insert blocks, respectively, under control of CPU 83. When operating in a "slave mode", wherein the video routing and processing module forms part of microtile unit 1 or input module 9, command data embedded in the video stream (e.g. the AUTOADDRESS commands used for self-organizing and configuring of microtile units 1) are extracted and applied to control logic 105. More particularly, the packetize and unpack data blocks perform the necessary conversion between 8B10B encoded data blocks and raster scan video data signaling.

CPU interface 115 exchanges commands between control logic 105 and the CPU 83 (where the video routing and processing module forms part of the control module 7). Register file 117 stores configurations and settings for control logic 105.

An OSD (On Screen Display) module 119 for overlaying user menus generated by the CPU 83 on video data transmitted to the various microtile units 1.

A 3×3 FIR filter 121 is provided for anti-aliasing the input video signal to permit keystone correction, as is known in the art. A further FIR filter 123 performs bilinear image scaling (2×2 scalar filter), and rotation (keystone correction) based on information received from the alignment process discussed above in connection with FIGS. 6A and 6B. Frame buffer 73 stores portions of the required image and downloads the necessary filter coefficients to the filter 123. After scaling, the filter 123 performs an additional high pass filter operation on the output video signal for increased image sharpness (3×3 sharpness filter).

Filtered signals output from filter 123 are applied to a block 125 via line buffer 124, for color matching, edge blending, uniformity correction and gamma correction. For color matching, block 125 implements a 3×3 (RGB) color correction matrix based on input from the sensors discussed above in connection with FIGS. 6A and 6B to correct color differences resulting from manufacturing tolerances associated with the microtile units 1, as well as the effects of temperature and aging on the illumination light source. Edge blending is used for the "grid" microtile embodiment of FIGS. 4A, 4B and 4C, as is known in the art. Likewise, gamma correction is performed in a conventional manner.

An output timing block 127 includes a further PLL to accommodate various display types and programmable output timing.

Preferably, the module also includes a GPIO (General Purpose Input/Output) block 129 for providing a set of IO ports which can be configured for either input or output, and to support common bus protocols such as the $I^2C$ (Inter-Integrated Circuit), serial computer bus 133 described in U.S. Pat. No. 4,689,740.

An IR receiver 131 is provided for remote control of the associated module 1, 7 or 9.

A fan 135 provides cooling for the module (whether a microtile unit 1, system control unit 7 or input module 9), in a well-known manner.

Although not shown, GPIO 129, IR receiver 132, and $I^2C$ interface 133 are connected to control logic 105.

A person skilled in the art, having read the description embodiments described heretofore, may conceive of variations and alternative embodiments. For example, although the embodiment of FIG. 1 includes a single source of power 7, which is distributed amongst the plurality of microtile units 1, it is contemplated that each microtile unit 1 may incorporate its own power supply, especially for small configurations of microtile units 1. Likewise, it is contemplated that, whereas the illumination for the microtile units 1 discussed above is self-contained, light from one or more light sources may be distributed to multiple microtile units 1. All such variations and alternative embodiments are within the scope of the present specification.

Figure 9:
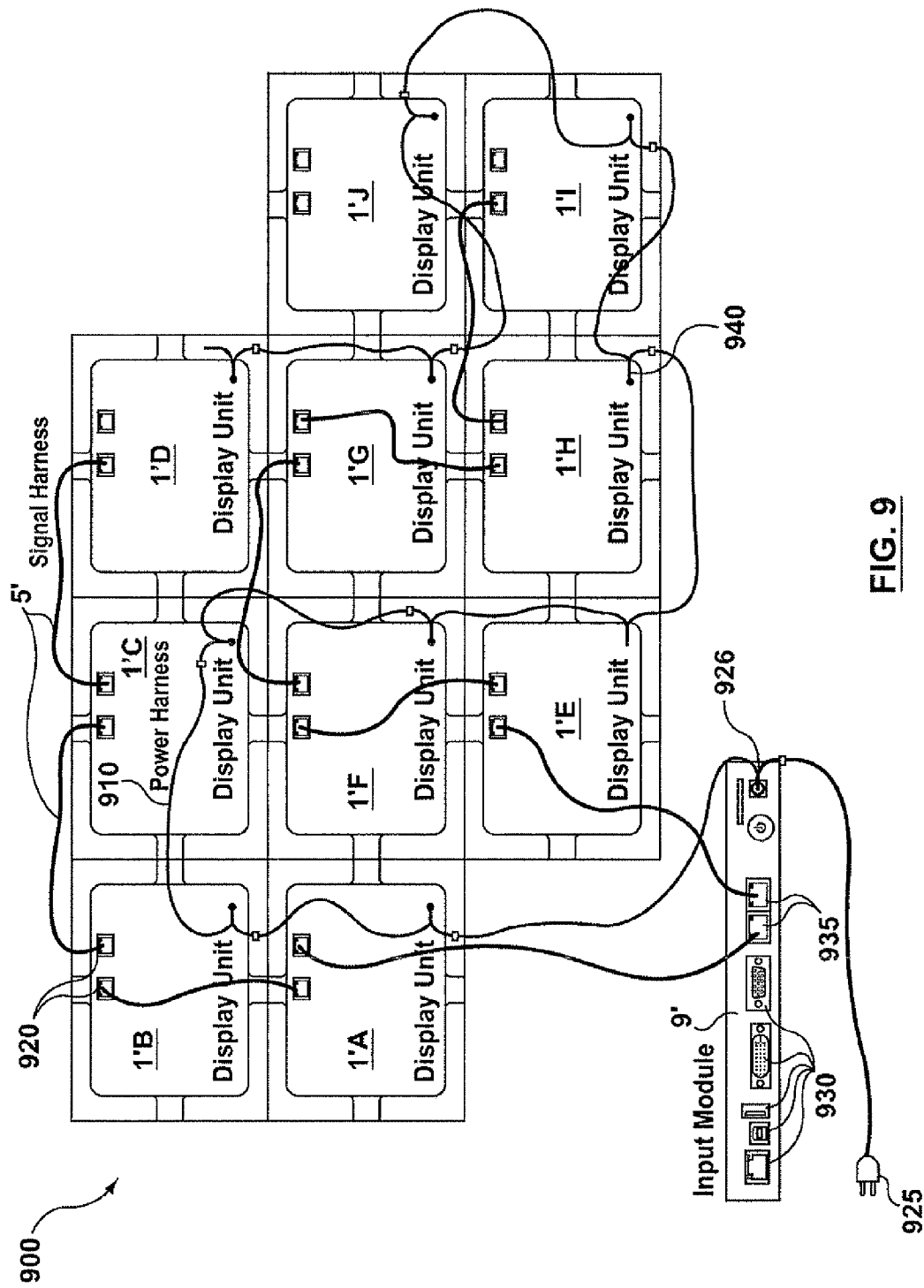
FIG. 9 depicts a block diagram of an imaging system, according to a non-limiting embodiment.

Attention is now directed to FIG. 9 which depicts a block diagram of an imaging system 900, according to a particular non-limiting embodiment. The system 900 is similar to the system depicted in FIG. 1, with like elements having like numbers, however labeled with a prime ('). For example, microtile units 1'A, 1'B etc. (generically a microtile unit 1' and collectively microtile units 1') of system 900 are similar to the microtile units 1 of FIG. 1. Differences between the elements of the system depicted in FIG. 1 and the elements of system 900 will be described hereafter. In general, the system 900 comprises an array of microtile units 1', at least one input module 9', a signal harness 5' (for example, cable 5 of Figure), and power harnesses 910.

The signal harness 5' is enabled to convey a data signal (e.g. a video signal) between the microtile units 1' and the input module 9', the signal harness 5' comprising a plurality of cables enabled to connect the microtile units 1' with each other in any sequence, and to further connect the microtile units 1' with the input module 9'. The power harness 910 comprises a plurality of cables enabled to provide power to the microtile units 1', the power harness 910 connected to the microtile units 1' in any sequence, and the input module 9'. The signal harness 5' and the power harness 910 are described in further detail below.

As described above with reference to microtiles 1 in FIG. 1, the microtile units 1' are generally self-organizing. Each microtile unit 1' comprises a self contained mini-display unit and at least two signal ports 920, the signal harness 5' connectable to the signal ports 920. The signal ports 920 are generally interchangeable, such that that the order in which signal harness 5' is connected is immaterial. Each signal port 920 is enabled for bi-directional flow of data, for example via an input channel and an output channel, such that data may flow bi-directionally through the system 900 when the microtile units 1' are connected. In some embodiments, each signal port 920 is enabled for bidirectional flow of video data (e.g. video signals), each signal port 920 comprising a 5 Gbps input channel and a 5 Gbps output channel. However, data rates are not to be considered particularly limiting. In general, one of the signal ports 920 is designated as the active source, and the data (e.g. a video signal) on a channel associated with the active source is displayed on the micro tile units 1'.

The microtile unit 1' is further enabled as an active relay, passing data both ways up and down the chain. This enables a video signal to be reliably distributed through the entire array of microtile units 1' with a minimum of cabling, and a minimal risk of signal degradation.

In some embodiments, each face of the microtile unit 1' that neighbours a display side of the microtile unit 1' (e.g. top, bottom, left, and right sides), comprises a photodetector (not depicted, however see FIG. 2 for an embodiments of a block microtile unit 21 in which each of two adjacent faces of the block microtile unit 21 comprises a photodetector, each of the two adjacent sides neighbouring a display side). In general, the photodetectors will be aligned to detect stray light from any neighbouring microtile units 1' in the array. This arrangement enables self organization of the microtile units 1', as described above, however using the input module 9' of the system 900, described below.

With the information gathered from the self organization, individual microtile units 1' "know" their position within the array (e.g. each microtile 1' is provisioned with array data as a result of the self organization). Further, individual microtile units 1' "know" the video signal characteristics (e.g. each microtile 1' is enabled to process the video signal). Using these two pieces of information, each microtile tile 1' is enabled to crop an input image in the video signal to select its own portion of the main image, thereby producing a sub-image, and then scale the sub-image to fill its own display screen. In embodiments of the microtile unit 1' that include the DDR interface of FIG. 8, the DDR interface is enabled to crop an input image in the video signal to select its own portion of the main image, thereby producing a sub-image, and then scale the sub-image to fill the display screen of the microtile unit 1'.

The system 900 comprises at least one input module 9'. The input module 9' is similar to the input module 9, described above, however the input module 9' is further enabled with the functionality of the system control described above. Hence, the input module 9' acts as a source of data/video signals/images to be displayed at the microtile units 1' while assisting in the self-organization process.

The input module 9' is generally enabled to couple to a source of power via a suitable connector 925, for example a connector enabled to plug into a suitable wall outlet. The input module 9' further comprises a connector 926 enabled to couple to the power harness 910, the connector 926 enabled to convey power from the connector 925 to the power harness 910, thereby providing power to the microtile units 1'.

In some embodiments, the input module 9' is enabled to couple data sources into the array of microtile units 1', including but not limited to standard video sources, for example via at least one data input port 930. In some of these embodiments, the input module 9' may be adapted to couple a specific data source into the array, according to any suitable desired specification, via a specifically enabled input port 930. However, the number of input ports 930 is not particularly limiting and can range from one data input port 930 to any desired combination of data input ports 930. For example, in some embodiments, the at least one data input port 930 comprises any desired combination of DVI input(s), HDMI input(s), VGA input(s), CVBS input(s), SVideo input(s), Component input(s), USB input(s), serial input(s) and/or Ethernet input(s). Further, the configuration and/or standard of the at least one data input port 930 and/or any data/video signals being conveyed through the at least one data input port 930 is not to be considered particularly limiting, and indeed other broadcast standards/data input port configurations that may occur to a person of skill in the art are within the scope of present embodiments. For example, should video and/or broadcast standards such as SDI or HDSDI, be desired, the input module 9' may be adapted in kind.

From the perspective of a video source coupled to the array via the input module 9', the array of microtile units 1' will appear like a single video monitor. Further, the system 900 may be enabled to support extended display identification data (EDID). The EDID contents, as known to a person of skill in the art, may be updated to reflect the arrangement of the microtile units 1' in the array, and further, in these embodiments, the EDID may specify a preferred video resolution.

In some embodiments, the input module 9' may be adapted for flash memory or hard disk playback. For example the input module 9' may comprise a flash memory card which comprises pre-rendered content (e.g. graphics, images, video, etc.). The input module 9' may be further enabled to cause to the array of microtile units 1' to cycle through a sequence of graphics, images, videos etc. (e.g. a slideshow) at a set rate. Such a configuration enables the system 900 to operate in a standalone mode, with no external source of data. Updating the content of the flash memory card can be performed via any suitable communications standard and data input port 930 (e.g. including but not limited to USB, Ethernet, WiFi, etc). In some embodiments, the input module 9' is enabled for streaming video from a storage medium (hard disk, USB thumb drive, CF Flash etc.) or it could accept compressed streaming video from a network interface (Ethernet, USB, WiFi, etc).

The input module 9' is further enabled to process data signals received via the at least one data input port 930 into an output data signal suitable for processing and display at the microtile units 1'. For example, the input module 9' may be enabled to process video signals into an output video signal suitable for display at the microtile units 1'. Indeed, it is advantageous and cost effective to centralize video processing at the input module 9', as there are generally fewer input modules 1' in an imaging system such as system 900, than there are microtile units 1'. For example, in a specific non-limiting embodiment, one input module 9' may be enabled to couple to as many as 20 microtile units 1'. However, the number of microtile units 1' which may be coupled to an input module 9' is not to be considered particularly limiting.

Hence the input module 9', may be enabled with a plurality of video processing features, including but not limited to color space conversion, noise reduction, and/or detail enhancement, etc. Further, in some embodiments, the input module 9' may be enabled for down scaling and/or frame rate conversion. In further embodiments, the input module 91 may be configured with a specific set of video processing features according to image quality requirements of a specific application. In yet further embodiments, the input module 9' may be enabled to couple interlaced video sources into the array of microtiles 1'. In some of these embodiments, the input module 9' is enabled with deinterlacing logic.

The input module 9' hence further comprises at least one signal port 935 enabled to couple to the signal harness 5', and thereby distribute the output data signal to the microtile units 1'. In some embodiments the output data signal comprises a video signal, and in a particular non-limiting embodiment, the output data signal comprises progressive scanned 24 bit RGB video. In some embodiments, due to the bi-directional nature of data flow in the system 900, as described above, the at least one signal port 935 is further enabled to receive data signals from the array of microtile units 1', the data signals from the array of microtile units 1' generally comprising command signals received from the microtile units 1'. In some embodiments, the data signals from the array of microtile units 1' comprise the output data signal with command signals from the microtile units 1' inserted therein, as will be described below.

The input module 9' may be further enabled for drawing full frame images, which allows low frame rate image generation from pre-rendered material stored on a flash card, or download through at least one data input port 930, such as a USB port.

The input module 9' may also comprise a user interface, either physical, electronic, or a combination. For example, in a particular non-limiting embodiment, the input module 9' may be enabled to generate an on-screen display (OSD), for example on the array of microtile units 1', a given microtile unit 1' in the array of microtile units 1', and/or an external display device coupled to the input module 9', e.g. via a USB port, a serial port, an Ethernet port and the like.

In a particular non-limiting embodiment, the input module 9' comprises a USB 1.2 device port, a serial port and an Ethernet 10/100/1000 port for user control. Features of the system 900 may be addressable and controllable through any of these three ports. In some embodiments, the input module 9' may be enabled for communication via Bluetooth 2.1 for remote control of the system 900.

In further embodiments, the input module 9' comprises a USB 2.0 host port, which enables field upgrades of firmware. The USB 2.0 host port may be enabled for download of pre-rendered content for semi-static display. Pre-rendered content can be in any suitable file format (e.g. JPEG, JPEG2000, TIFF, PDF, etc.)

Communication between microtile units 1', generally occur via the signal ports 920 and the signal harness 5', and communication between the input module 9' and microtile units 1' occurs via the signal port(s) 935, the signal ports 920 and the signal harness 5'. In a particular non-limiting embodiment, each of the signal ports 920 and the signal port(s) 935 comprises a serial video interface. As described above, during the blanking interval of a video signal/stream, commands can be inserted into the video stream by the input module 9' and/or a microtile 1', and extracted at another microtile unit 1' (e.g. the next microtile unit 1'). TCP/IP with DHCP may be used to assign each microtile unit 1' a unique address, to enable addressing of individual microtile units 1', and to further transmit commands to a specific microtile unit 1'.

The signal harness 5' is enabled to convey data and command signals between microtile units 1'; however, the sequence in which microtile units 1' are connected is generally immaterial. In a particular exemplary embodiment, the microtile units 1''s are connected in a daisy chain configuration. The block diagram depicted in FIG. 1 shows one example of a daisy chain configuration; however, any sequence would be equally acceptable for basic operation. In some embodiments, complex modes of operation may require specific wiring schemes, for example see FIG. 10.

In some embodiments, the signal harness 5' comprises 4 wire pairs of 100 ohms differential impedance, and is enabled to sustain 2.5 Gbps of data per pair over a distance of 5 m. In a preferred embodiment, the signal harness 5' comprises a commonly available type so that in the field, a user can readily find replacement parts should a cable get damaged or lost. In some embodiments, the signal harness 5' comprises CAT5 cables and/or crossover CAT6 cables, however any other suitable cable is within the scope of present embodiments.

In a particular non-limiting embodiment, each microtile unit 1' may comprise its own universal power supply (110V-240V, 50 Hz/60 Hz). Further, the power harness 910 comprises at least one power splitter cable 940 for each microtile unit 1', in a one-to-one relationship. The power splitter cable 940 forms a T junction, wherein one end of the T is enabled to plug into the back of a microtile unit 1'. The other two ends of the power splitter 940 enable to the power harness 910 form a daisy chain with other microtile units 1' (e.g. neighbouring microtile units). Each leg of the power splitter cable 940 may comprise a unique connector enabled for connection in only one manner (i.e. the power splitter 940 is installable in only one configuration). The number of microtile units 1' that may be daisy chained is not particularly limiting, though there may be limitations based on the power supplies at the microtiles 1' and/or any power supplies at the input module 9' and/or the power available through the connector 925. The number of microtile units 1 on a single daisy chain may also be limited by the gauge of wire chosen for the power splitter cable 940, and by safety regulations in the location of the installation.

In some non-limiting embodiments, the system 900 may further comprise at least one line cord adapter module (not depicted), with one a line cord adapter module enabled to power a given number of microtile units 1'. In some embodiments, the line cord adapter enables the originating leg of one of the first power splitter cable in the daisy chain to be plugged into a standard wall socket. The line cord adapter module may be adapted for the particular type of wall socket available (e.g. different countries have different types of wall sockets), and the parameters of the power available via the wall socket. In some embodiments, the line cord adapter may comprise a circuit breaker with reset of a suitable amperage (e.g. 12 amps), and warning LED indicator. This circuit breaker is enabled to trip if too many microtile units 1' are connected to the line cord adapter (i.e. too many microtile units 1' in a single circuit). The line cord adapter may be labeled with user instructions explaining the limit on the number of microtile units 1' that may be plugged into the line cord adapter. Alternatively, input module 9' may be enabled with the functionality of the line cord adapter.

In a particular non-limiting embodiment, up to 12 microtile units 1' may be daisy chained together in the system 900, with one line cord adapter for every 12 microtile units 1'.

Returning now to the self-organization process described above with reference to the system of FIG. 1, some embodiments of system 900 may comprise a plurality of input modules 9' (e.g. see system 1000 depicted in FIG. 10 and described below). Further, each microtile unit 1' and each input module 9' comprises a microprocessor, and the self organization process commences relying in part on processing at each microtile unit 1' and each input module 9'. However, in such embodiments, one input module 9' in the entire array will be designated as system master, for example upon power up, and all other units will act as slave devices. In some embodiments, only an input module 9' may act as master.

However, upon power-up of system 900, multiple system masters may be present in the system 900, for example embodiments of system 900 with more than one input module 9' attached. For example, between power ups and power downs, an input module 9' may be added, removed, or relocated within the array. Hence, on power up, all input module 9's may initially assume they are the system master, and begin the self organization process. At some point, however, two system masters will encounter each other, and hence the system 900 is enabled with an arbitration scheme such that only one two input modules 9' is designated as the system master.

Figure 14:
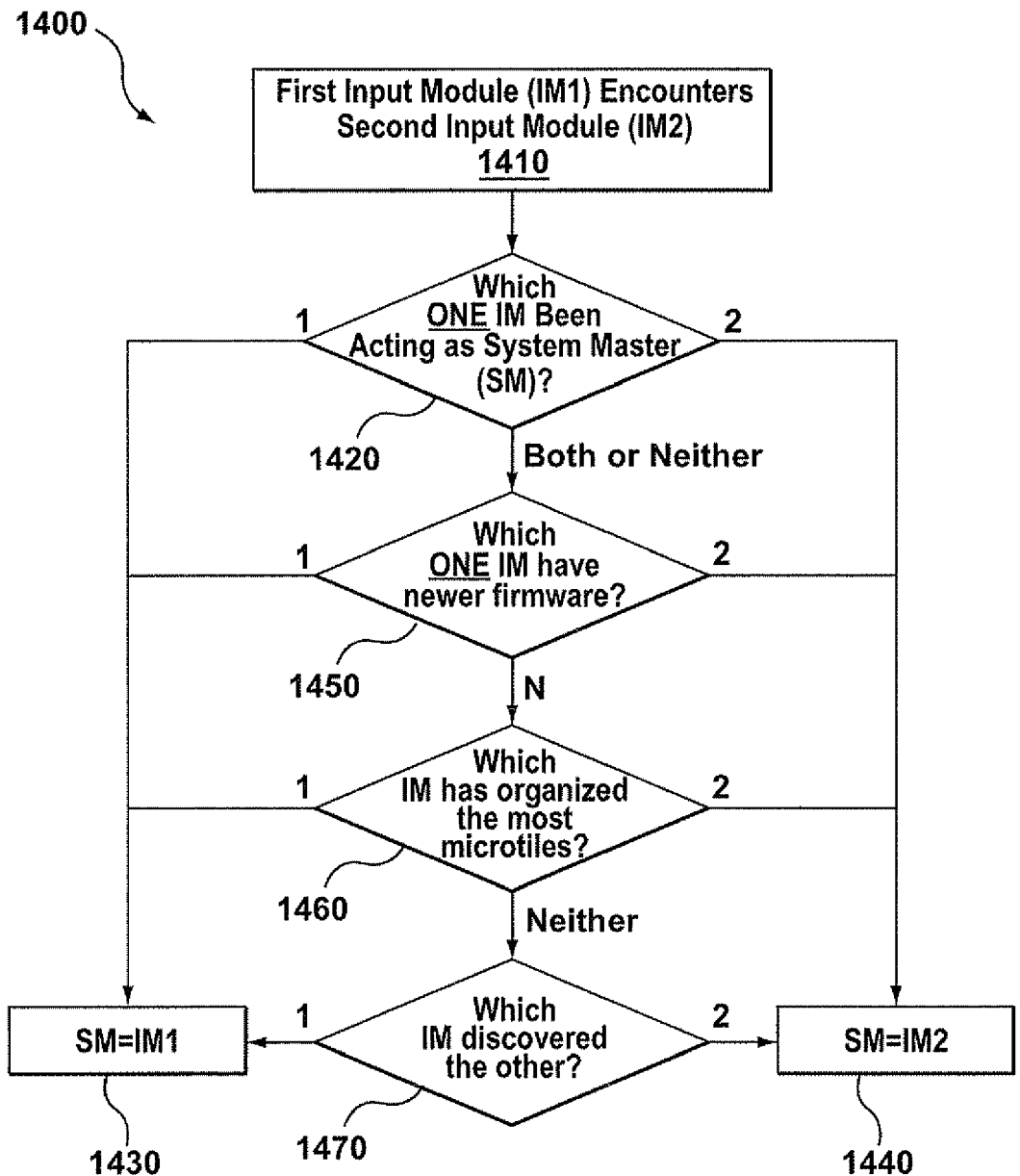
FIG. 14 depicts a method for determining a system master via non-limiting arbitration schemes when a plurality of input modules is present in an imaging system, according to a non-limiting embodiment.

Attention is now directed to FIG. 14 which depicts a method 1400 for determining a system master via non-limiting arbitration schemes when a plurality of input modules 9' is present in an imaging system such as system 900, according to a non-limiting embodiment. In order to assist in the explanation of the method 1400, it will be assumed that the method 1400 is performed using the system 900. Furthermore, the following discussion of the method 1400 will lead to a further understanding of the system 900 and its various components. However, it is to be understood that the system 900 and/or the method 1400 can be varied, and need not work exactly as discussed herein in conjunction with each other, and that such variations are within the scope of present embodiments.

At step 1410, a first input module 9' encounters a second input module 9'. At step 1420, if immediately prior to the last power down, one of the two input modules 9' had been acting as system master, and the other as slave, then the input module 9' that was last system master remains system master, at step 1430 or step 1440. At step 1450, if both input modules 9' had been a system master, or neither a system master, then the system master may be designated based on firmware revision, such that the input module 9' with the newest firmware is designated as system master, at step 1430 or step 1440. If the same version of firmware is in both input modules 9', then at step 1460, the input module 9' that has already organized the largest number of microtile units 1' may be designated as system master, at step 1430 or step 1440. Alternatively, at step 1470, the input module 9' that first discovers the other input module 1' is designated as system master, at step 1430 or step 1440. Other arbitration schemes are within the scope of the present specification, however, and the arbitration scheme is not to be considered particularly limiting. Further the order of steps 1420 through 1470 is not to be considered particularly limiting, and in some of embodiments, at least one of steps 1420 through 1470 may be optional, and another arbitration scheme used.

Figure 15:
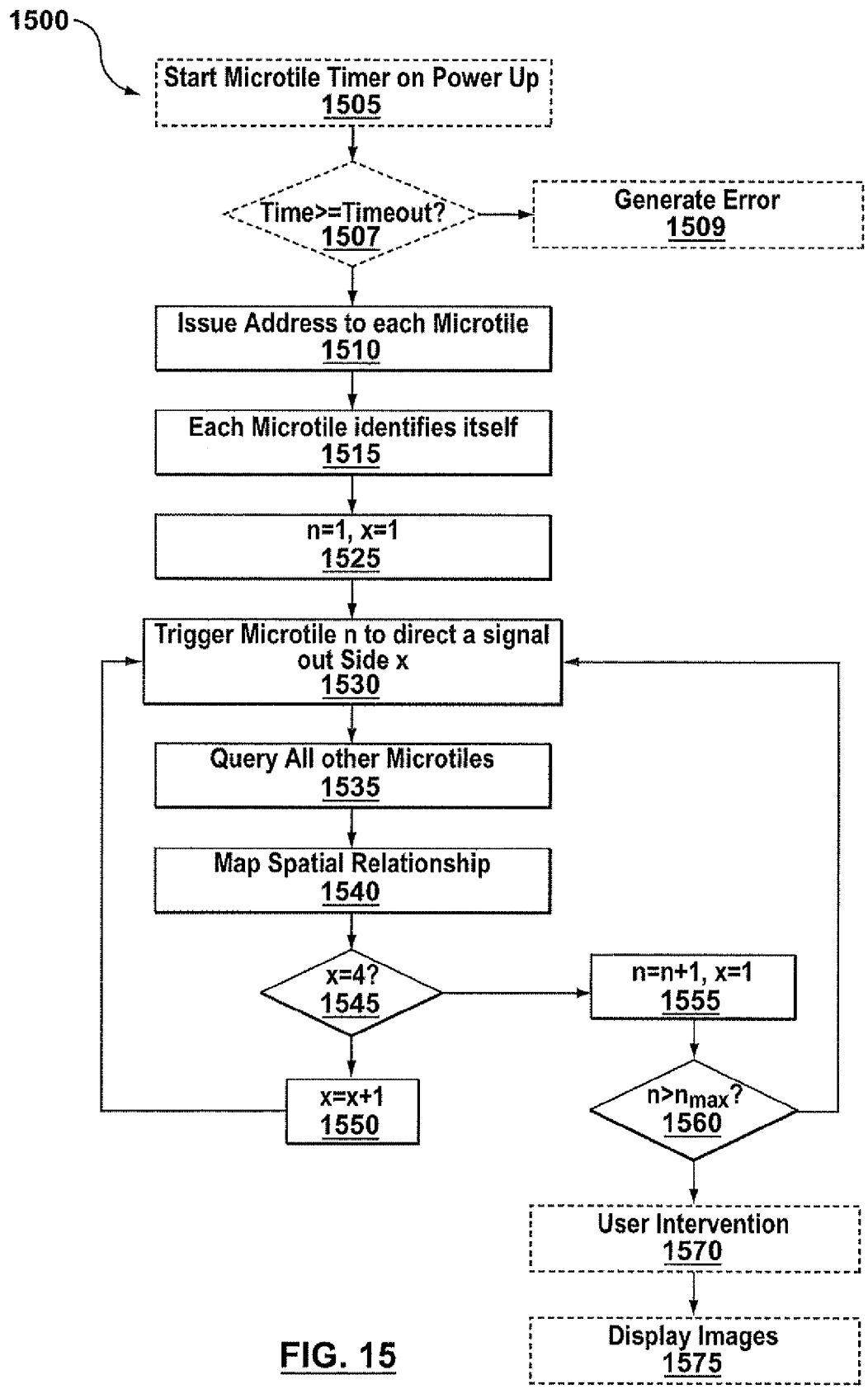
FIG. 15 depicts a method of self organization, according to a non-limiting embodiment.

Attention is now directed to FIG. 15 which depicts a method 1500 of self organization, according to a non-limiting embodiment. In order to assist in the explanation of the method 1500, it will be assumed that the method 1500 is performed using the system 900. Furthermore, the following discussion of the method 1500 will lead to a further understanding of the system 900 and its various components. However, it is to be understood that the system 900 and/or the method 1500 can be varied, and need not work exactly as discussed herein in conjunction with each other, and that such variations are within the scope of present embodiments.

In general, and as described in some detail above, self organization is controlled by the system master, and happens in three phases. Phase one is Address Assignment (step 1510). Phase two is Module Identification (step 1515). Phase three is Array Mapping (steps 1525-1560). Once these three phases are complete, the system master will know everything it needs to know in order to control the system. In some embodiments the input modules 9', microtile units 1' may be further enabled to support hot plugging (i.e. an input module 9' and/or a microtile unit 1' are plugged into the array after power-up/self-organization), for example by transmitting a signal to a neighbouring element to determine if self-organization has already occurred; if so, the new element may then trigger another self-organization of at least a portion of the array. Other methods of supporting hot plugging are with the scope of present embodiments.

In the Address Assignment phase, at step 1510, the system master will issue an "AUTOADDRESS 1" command to the first microtile unit 1'A connected to a first one of the at least one signal ports 935. The receiving microtile unit 1'A will respond by setting its internal address to "1". The microtile unit 1'A will then send an "AUTOADDRESS 2" command to the next microtile unit 1'B in the daisy chain (i.e. out the opposite signal port 920). Microtile unit 1'B, upon receiving the "AUTOADDRESS 2" command will set its internal address to "2", and send an "AUTOADDRESS 3" to microtile unit 1'C. Microtile unit 1'C in turn will configure the next microtile unit 1' in the chain, and so on. In this manner, all microtile units 1' connected to one side of the system master will be assigned a unique ID number.

In the Module Identification phase, at step 1515, the system master will probe to determine what is connected to it. It will start by requesting the microtile unit 1' at address 1 to identify itself. Each microtile unit 1' responds, indicating its presence. If the responding microtile unit 1' is connected to another input module 9', it will indicate which input module 9' type is present. In addition, revision information may be included in the response to assist with any forward or backward firmware compatibility issues. This enables the system master to know what is connected at address 1. It will then request the same data from address 2, 3, etc. If a request is met with no response, the system master will know it has reached the end of the chain.

Once all microtile units 1' connected to the first one of the at least one signal ports 935 of the system master have been assigned an address and been identified, the process (i.e. steps 1510 and 1515) can be repeated for the microtile units 1' connected to a second one of the at least one signal ports 935, with the first microtile unit 1'E connected to this signal ports 935 getting the next address in sequence.

The Mesh Mapping phase is used to establish the spatial relationship between the connected microtile units 1'. Each tile will have the ability to direct a small portion of light out a small hole cut into each side of the tile (i.e. top, bottom, left and right). The process will start with steps 1525 and 1530, with the input module 9' sending a command to microtile unit 1'A to direct light out its top hole, for example via a top spill-light (e.g. an LED). The mechanical design will ensure that only one microtile unit 1' photodetector can see this leaking light. At step 1535, the system master will query all attached microtile units 1 to ask who can see the top spill-light. Only one microtile unit 1' will respond in the affirmative. From this, the system master will now know which microtile unit 1' is directly above microtile unit 1'A (e.g. microtile unit 1'B), and the spatial relationship between microtile 1'A and the responding microtile 1' can be mapped at step 1540. The system master will then command microtile unit 1'A to turn off its top spill-light and to turn on another spill-light, such as the right spill-light (e.g. steps 1550 and 1530). Another query to the array will reveal the address of the unit immediately to the right of microtile unit 1'A (e.g. microtile unit 1'F). Two more commands and queries will map out the bottom and right sides of microtile unit 1'A (i.e. steps 1530 through 1550 are repeated for all four sides). If there are no tiles located in those spaces, all microtile unit 1's will respond that no light was detected, and the system master will know it has found a boundary.

In some embodiments, adjacent microtiles 1' may be detected via a signal/detector combination other than a light an photodetector. For example, an infrared light may be used with a suitable photodetector. In other embodiments, each microtile 1' may comprise at least one RFID tag identifying the microtile 1', and an RFID reader suitable for reading RFID tags in adjacent microtiles 1'. In some of these embodiments, each side of each microtile 1' comprises an RFID tag identifying the side with which it is associated. In these embodiments, adjacent microtiles 1' can be identified by triggering all other microtiles 1 to read the tags of adjacent microtiles 1' until the microtile 1' in question is found: hence, step 1530 is skipped.

In any event, once all four sides have been mapped (i.e. step 1545), the system master then proceed to microtile unit 1'B, at step 1555 and repeats the process until all the microtiles 1' have been mapped (e.g. the system master knows the number of microtiles 1' in the array from step 1510 and stops querying at step 1560 when all the microtiles 1' have been queried). In some embodiments, if the relative position of the microtile 1'B with respect to another microtile 1' has already been established, such as the relative position with respect to microtile l'A, the detection of microtile 1'A is redundant and may be skipped. By carrying out this procedure through the entire array, a map can be built indicating precisely how the array of microtile units 1' is configured with respect to one another.

However, the self organization process assumes that each microtile unit 1' in the array is in direct physical contact with at least one other microtile unit 1'. If the microtile units 1' are not contiguous, in some embodiments, set-up may be completed via user intervention at step 1570, for example via the user interface, or through external software. Furthermore, some embodiments may be enabled to allow a user to override the settings determined in the self discovery phase, and assign any portion of an data signal, such as an input image (graphics, static images, video, etc.), to any microtile unit 1' manually.

In some embodiments, loop around occurs when if the daisy chain of the microtile units 1' and the system master/input module 9' are closed into a loop. In these embodiments, during the Address Assignment phase, the system master will be the starting and terminating element in the loop. This allows for a low cost redundancy in the array. Due to the daisy chaining nature of the architecture, the array may be susceptible to single point failure: If one microtile unit 1' fails, or a portion of the signal harness 5' fails, all subsequent microtile units 1' will loose their signal source. By closing the daisy chain into a loop, there will be two signal and control paths from the system master to each microtile unit 1'. If one microtile unit 1' fails, the subsequent microtile unit 1's can be accessed through the alternate signal path.

In other embodiments, a 'no source loop' occurs if the microtile units 1' are inadvertently daisy chained without an input module 9'. A no source loop may also occur if the signal harness 5' gets damaged, or becomes unplugged. To account for this situation, in some embodiments, each microtile unit 1' further comprises a timer, and on power-up, at step 1505, each microtile unit 1' starts their timer. If a microtile unit 1' doesn't receive a communication from a System Master before a timeout period expires, at step 1507 a suitable error message may be generated at step 1509, for example via internal OSD capabilities (e.g. a flashing red screen with a text based error message displayed at the microtile 1').

Figure 10:
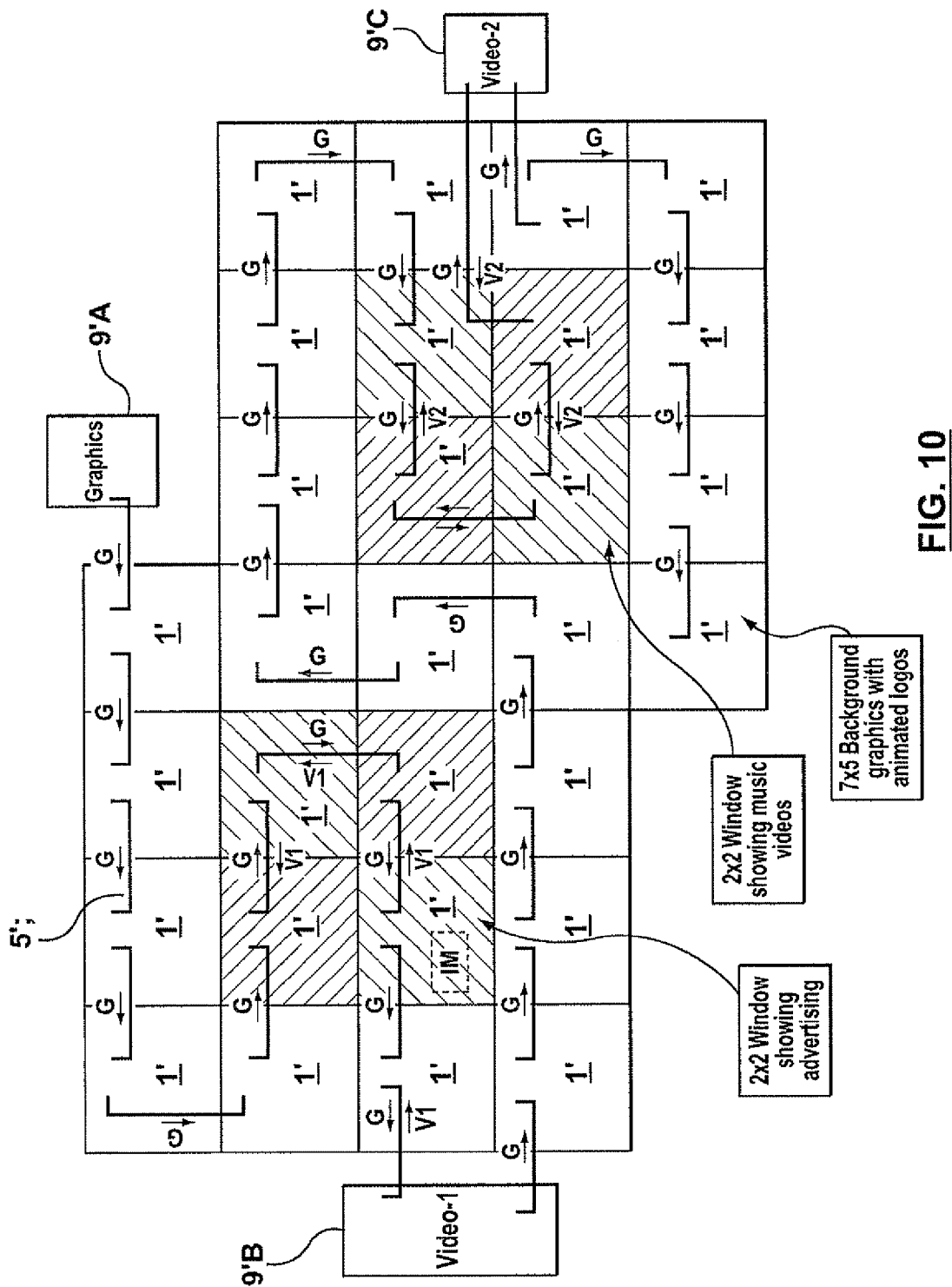
FIG. 10 depicts a block diagram of an imaging system, according to a non-limiting embodiment.

Attention is now directed to FIG. 10, which depicts a block diagram of an imaging system 900A according to a particular non-limiting embodiment, the system 900A being similar to system 900 with like elements having like numbers. The system 900A differs from the system 900 in that system 900A comprises three input modules 9'A, 9'B and 9'C, similar to embodiments of input module 9', and further the microtile units 1' have been wired together, via the signal harness 5', in a manner that supports a Picture-in-Picture (PIP) configuration. In the exemplary embodiment, it is assumed that the data signal comprises a video signal, though it is understood that the video signal can comprises still images, moving images, graphics, video, etc., in any suitable format.

For example, the bidirectional nature of the video interconnect scheme allows multiple input modules 9' to be active at the same time. That is, one input module 9'A can broadcast one data signal up (and/or down) the chain, while a second input module 9'B can broadcast a second data signal up (and/or down) the chain. The system 900A can be configured such that an image based on the first data signal is displayed on a first subset of the microtiles 1', while an image based on the second data signal is displayed on a second subset of the microtiles 1'. The system 900 can be further enabled to support multiple PIP windows, given particular interconnection schemes, such that a third input module 9'C can broadcast a third data signal up (and/or down) the chain, with an image based on the third data signal is displayed on a third subset of the microtiles 1'.

For example, from the Mesh Mapping process the system master is enabled to know the configuration of the array, and further the wiring of the microtiles 1'. From this information, the user interface can be enabled to guide the user into setting up PIP combinations. For example, once a desired PIP combination is determined, PIP mapping scheme data may be stored at the system master (or another element accessible to the system master), the PIP mapping scheme data comprising the identifiers (e.g. addresses) of each of the microtiles 1' in each of the subsets of microtiles 1' that display each given image from each different data source, along with their relative positions.

It is understood that the wiring scheme depicted in FIG. 10 is but one of a number of possible wiring schemes that would also enable PIP configurations, and each of these possible wiring schemes are within the scope of present embodiments. However, there are also wiring schemes that would not enable PIP configurations, and a user wiring the microtiles 1' may need some knowledge of the desired configuration (PIP or otherwise) prior to wiring the microtiles 1'. Hence, to aid in the wiring of the microtiles 1', the system 900A may further comprise an application for designing suitable PIPs (e.g. the application running on an external PC, an input module 9' and/or one or more of the microtiles 1'), the application generating a wiring/interconnect scheme that a user may follow to achieve the desired results.

FIG. 10 further depicts a non-limiting example of how the system 900A may be configured to support multiple PIPs. In this example, the microtiles 1' are wired together in a daisy chain with the three input modules 9'A, 9'B and 9'C. During self organization, one of the input modules 9' is designated as the system master, as described above. Input module 9'A is configured to supply graphics G ("background graphics with animated logos"), to the microtiles 1', input module 9'B is configured to supply a video signal V1 ("advertising") to the microtiles 1', while the input module 9'C is configured to supply a video signal V2 ("music videos") to the microtiles 1'. Via the PIP mapping scheme data, knowledge of the relative positions of the microtiles 1', and knowledge of the input modules 9', the system master causes the graphic G, the video signal V1 and the video signal V2 to be displayed on the respective designated subsets of microtiles 1'. In some embodiments, once the data signal for a designated subset of microtiles has been propagated to all the microtiles 1' in that subset, the data signal is not propagated to the remaining microtiles 1' in the daisy chain, to save on processing resources.

Figure 11:
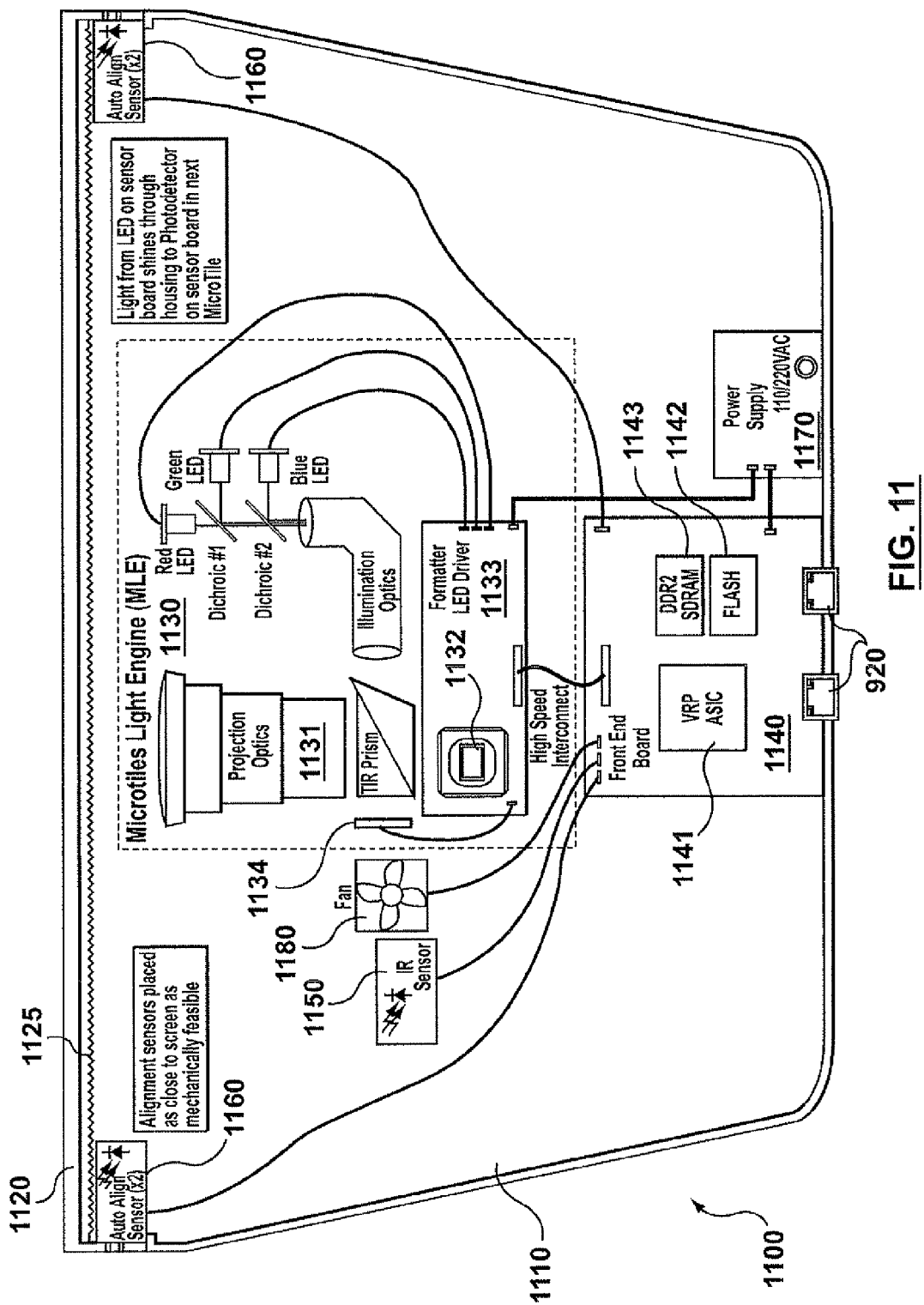
FIG. 11 depicts a block diagram of a microtile, according to a non-limiting embodiment.

Attention is now directed to FIG. 11, which depicts a block diagram of a microtile 1100 according to a non-limiting embodiment. In some embodiments, the microtile unit 1' of system 900 comprises the microtile 1100. The microtile 1100 comprises subsystems, including but not limited to a mechanical housing 1110, an optical screen 120, a microtiles light engine (MLE) 1130, a front end board (FEB) 1140, an infrared sensor 1150, at least one auto align sensor 1160, an internal power supply 1170, and a cooling system 1180 (e.g. a fan).

The mechanical housing 1110 is enabled to structurally support the other elements of the microtile 1100. The mechanical housing 1110 is desirably designed for manufacturability and low cost in high volumes. The mechanical housing 1110 desirably incorporates features to allow all the other elements of the microtile 1100 to be assembled with a minimum of screws or other mechanical pieces. The mechanical housing 1110 further comprises inter-tile supports to facilitate the assembly of multiple microtile 100s into a large array, for example the coupling mechanisms 23 of FIG. 2, the complementary threaded male portions 44 and female coupling sleeves 46 of FIG. 4A and/or the tubular coupling mechanisms 43 of FIG. 5. Each side of the microtile 1100 adjacent the optical screen 1120 (e.g. left, right, up, down) may comprise inter-tile supports (one or more) to enable a plurality microtiles 1100 to be assembled into an array, as in FIGS. 1, 3A, 3B, 4B, 4C, 10 and 11, etc. The inter-tile supports are enabled to couple together in a manner allows an array of microtiles 1100 to be assembled into a stand alone assembly. In some embodiments, for larger arrays, external supports may be added to the array to assist in the support of the array. In some embodiments, the mechanical housing 1110 and/or the inter-tile supports comprise additional features (e.g. clips etc.) that enable the microtiles 1100 to be connected to an external support without the need for additional hardware.

In some embodiments, the mechanical housing 1110 is generally configured to enable the microtile 1100 to operate in a given orientation (e.g. an upright, landscape orientation). However, in other embodiments the mechanical house 1110 may be configured to enable the microtile 1100 to operate in any other desired orientation. Other elements of the microtile 1100 may be configured to adjust for a changes orientation. In particular, the cooling requirements of the display elements (e.g. the MLE 1130) when the microtile 1100 is in a different orientation may be such that the cooling system 1180 may be configured (and/or re-configured) according to the desired orientation.

However, the microtile 1100 is generally provisioned to operate in the given orientation. Should an orientation other then the given orientation be desired, for example in the field, a user may be required to manually configure the microtile 1100 to get the desired orientation/operation.

The mechanical housing 1110 is further enabled to accommodate field servicing of a microtile 1100 in the event of a component failure. When assembled into a large array, it may not be possible to remove a single microtile 1100 without disassembling the entire array, or at least a significant portion. Thence, the mechanical housing 1110 is enable to allow a user to service a microtile 1100 in situ. In some embodiments, the mechanical housing 1110 is enabled to allow a user to have access to the interior of the microtile 1100 from the front (i.e. for example, via removal of the optical screen 1120 as described below). In other embodiments the mechanical housing 1110 is enabled to allow a user to have access to the interior of the microtile 1100 from the back (i.e. a side opposite the optical screen 1120 side). However, in yet further embodiments, the mechanical housing 1110 is enabled to allow a user to have access to the interior of the microtile 1100 from either the front or back, such that the microtile is repairable from either end. However, in many instances, the number of front access installations will out number the rear access installations. Therefore, it is desirable that the mechanical housing 1110 be enabled for serviceability for replacing a failed component from the front, and feasible when accessed from the rear.

Attention is now directed to the optical screen 1120, which may be selected based on its ability to maintain a suitable brightness, contrast, and sharpness when the microtile 1100 is viewed in high ambient light, the uniformity of the optical screen 1120, and the amount of glare. The gain of the optical screen 1120 may be configured based on a given viewing angle, as known to one of skill in the art. In general, wide viewing angles are desirable. In some embodiments, a Fresnel element 1125 may reside behind the optical screen 1120 (i.e. in the interior of the microtile unit 1100), to further enhance the image displayed at the optical screen 1120. If used, the Fresnel element 1125 is generally matched to the projection optics 1131 of the MLE 1130.

The combination of the projection optics 1131, illumination optics, and optical screen 1120 combine to give the microtile 1100 a given uniformity. In some embodiments, the uniformity is parabolic, with the center of the optical screen 1120 being brighter than the edges or corners. However, while the degree of given uniformity is non-limiting, a high degree of uniformity is generally desirable.

In some embodiments, uniformity may be corrected electronically. As there will generally be variation between microtiles 1100, a factory electronic calibration step may be employed to account for these variations. Further, an electronic calibration generally involves dimming the brightest part of the optical screen 1120 to match the dimmest part of the optical screen 1120, which reduces the overall brightness.

In some embodiments, the optical screen 1120 is removable from the mechanical housing 1110, which enables a user to access the interior of the microtile 1100, for example while a microtile 1100 is installed in an array. From a serviceability perspective, once an array is assembled and installed into its environment, the front may be the only accessible portion of the microtile 1100. Should it be necessary to get at the innards of the microtile 1100 for repair purposes, in many instances the front optical screen 1120 may be the only port of entry. However, an optical screen 1120 enabled for removability is further enabled to do so without affecting any gap between optical screens 1120 in an array.

In some embodiments, the side wall of the optical screen 1120 comprises a light pipe to compensate for the effects of a gap. In a non-limiting example, the side wall comprises a clear plastic. The projected image can then be slightly over scanned. The last outside border pixels of the image will shine onto the side wall, and be directed to the screen. This will fill the gap with light close in color and intensity to the desired pixels, generally making the seam less visible than if a black line was present. In some embodiments, the side wall comprises rounded and/or beveled edges, making the seam softer, and less apparent.

The optical screen 1120 is further enabled to be robust, and resistant to fingerprints, as in general, in the field, users may approach the optical screen 1120 and touch it. The optical screen 1120 is hence enabled for robustness against casual pressure from a finger press, such that such a finger press does not damage the optical screen 1120.

The optical screen 1120 is further enabled to be cleaned by commercial cleaning products. Hence, it may be desirable for the optical screen 1120 comprises a front surface (including any coatings), that can withstand solvents such to not have any coatings on the outer surface that may be damaged by solvents such as isopropyl alcohol, ammonia, ethylene glycol, etc.

Figure 12:
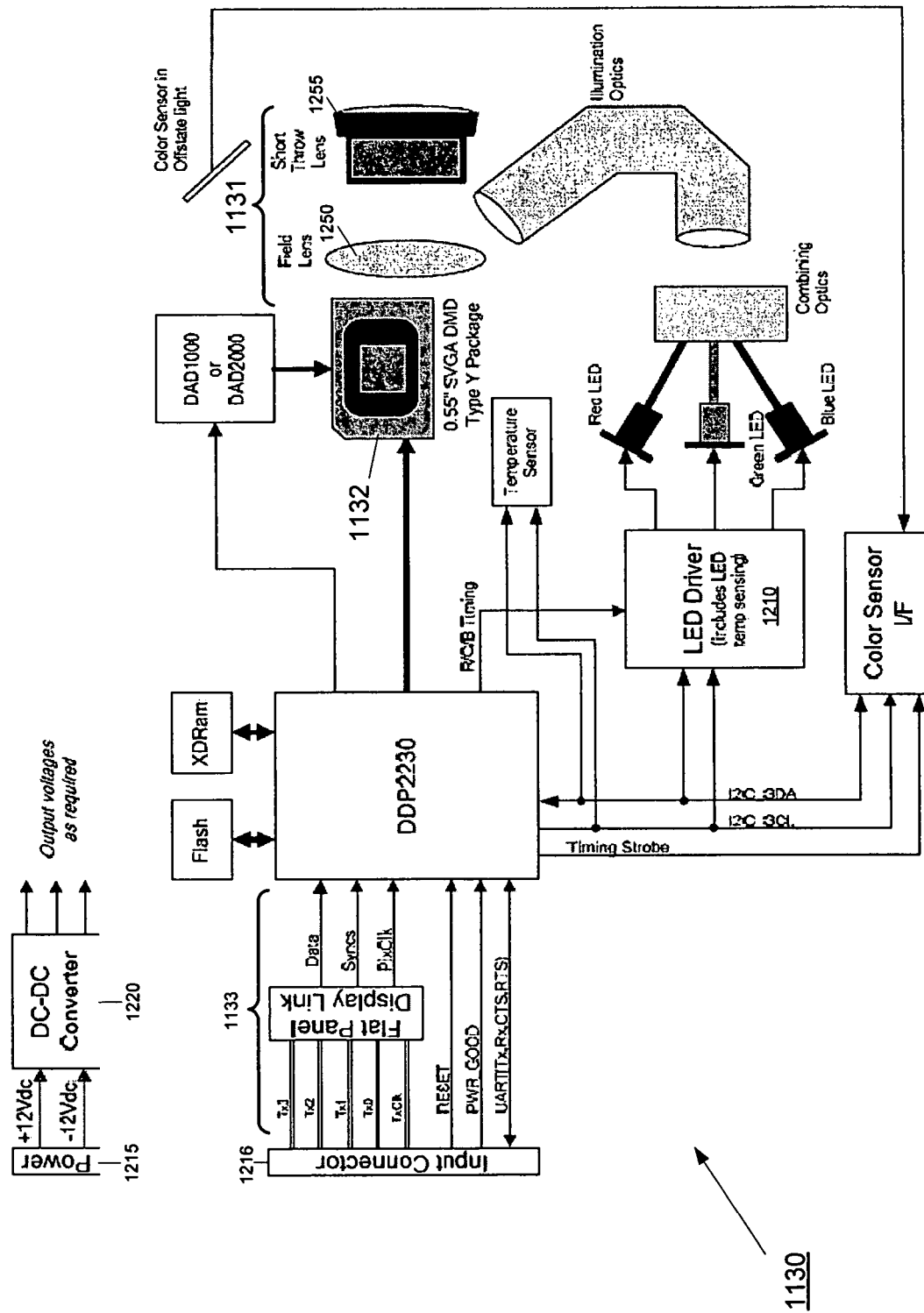
FIG. 12 depicts a block diagram of a microtile light engine, according to a non-limiting embodiment.

Attention is now directed to FIG. 12, which depicts a block diagram of the MLE 1130, according to a non-limiting exemplary embodiment. In some embodiments, the MLE1130 comprises a stand alone block, such that the MLE 1130 may be manufactured separately from the other elements of the microtile 1100, for example by a third party, and later inserted into the microtile 1100. In some non-limiting embodiments, the MLE 1130 is based on DLP technology, however other types of display technologies will occur to a person of skill in the art and are within the scope of the present specification In a specific exemplary non-limiting embodiment, the MLE 1130 comprises a 0.55" SVGA DMD 1132 in a type Y package. In some embodiments, the MLE 1130 further comprises the DDP2230 chipset (or any other suitable chipset) for driving the DMD 1132. The MLE 1130 further comprises an illumination source, which in the exemplary embodiment comprises three independently controlled LEDs (a Red LED, a Green LED and a Blue LED) enabled to illuminate the DMD 1132, for example via combining, and illumination optics (and, in some embodiments, a TIR (total internal reflection) prism). The MLE 1130 further comprises the drive circuitry 1210 for the illumination source. Illumination sources other than LEDs will occur to a person of skill in the art and are within the scope of present embodiments. For example, in some embodiments, the illumination source may comprise at least one laser. The MLE 1130 further comprises a light sensor 1134 enabled to measure the light intensity of the illumination source.

The MLE 1130, in the exemplary embodiment, further comprises two input connectors: a power connector 1215 for DC power (and enabled for coupling to the power supply 1170); and a source connector 1216 for receipt of a video signal and control (enabled for coupling to the FEB 1140).

The power source 1170 (see FIG. 11) in the exemplary embodiment generally comprises two rails: a +12V rail and a −12V rail. The MLE 1130 is enabled to power its electronics and the light source from power derived internally from these rails, for example via a DC-DC converter 1220.

The MLE 1130 comprises a video interface 1133 enabled, in the exemplary embodiment, to use the Flat Panel Display Link standard. The output video from the FEB 1140 is generally 24 bit color (8 bits per color, and the video and syncs will then be serially encoded onto 4 differential LVDS pairs. In addition, the video interface 1133 comprises a pixel clock (TxClk) supplied as a differential LVDS signal. The MLE 1130 is enabled to decode this signal into standard 24 bit video, and present it to the DMD 1132 (i.e. via the DDP2230 ASIC). A non-limiting example of a compliant receiver comprises National Semiconductor part number DS90CF384. In some embodiments, the MLE1130 may be controlled by the FEB 1140 using a UART interface. In addition, the RESET signal and a PWR_GOOD signal may be provided by the FEB 1140.

In the exemplary embodiment, the MLE 1130 is based on Single Chip DLP technology, and hence each color (i.e. LED) is turned on and off in sequence, synchronized to the data displayed on the DMD 1132. The timing of this sequence is generated by the MLE ASIC (e.g. the MLE ASIC comprises the video interface 1133). It is desirable that the MLE 1130 support an 8×RGB field rate.

The drive levels of each LED may be set by an I2C DAC. In these embodiments, the I2C master is the DMD 1132 (i.e. the DDP2230), and the I2C bus shall be available to the FEB 1140 via the UART interface.

The illumination optics will combine the output of the LEDs (or lasers) and focus the light onto the DMD. In some embodiments, the illumination optics has a telecentric design, and the illumination system may further comprise a prism or a field lens 1250 to separate on-state and off-state light. The projection optics 1131 is enabled to focus the image onto the optical screen 1120.

Though non-limiting, it is generally desirable that the microtile 1100 be thin, and hence, in some embodiments the projection optics 1131 comprises a short throw lens 1255, and specifically a very short throw lens (e.g. with a throw ratio of approximately 0.5:1), arranged to project an image directly on the optical screen 1120. In further embodiments, the projection optics 1131 comprises a longer throw lens (e.g. (e.g. with a throw ratio of approximately 0.8.1) coupled with a fold mirror. In some embodiments, the fold mirror may be built into the lens to minimize the size of the mirror, and ensure its alignment.

Figure 13:
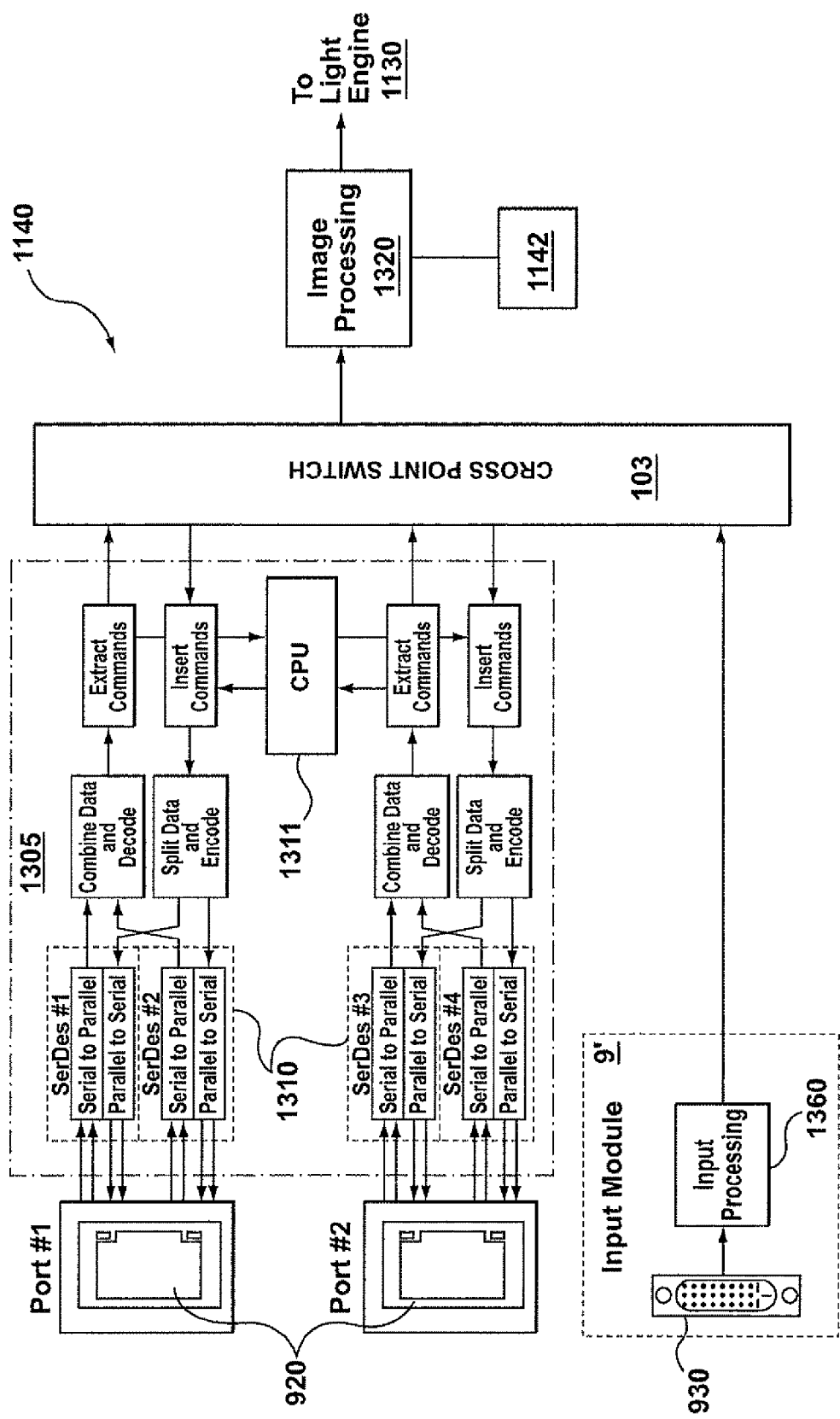
FIG. 13 depicts a signal routing scheme within a front end board, according to a non-limiting embodiment.

Attention is now directed to FIG. 13 (with further reference to FIG. 11), which depicts a signal routing scheme within the FEB 1140, according to a non-limiting embodiment. The FEB 1140 comprises the core processing elements for the microtile 1100, including but not limited to a Video Routing and Processing ASIC (VRP) 1141, which can, for example, be implemented as a structured ASIC. In some embodiments, programmable logic may be used as an alternative to using an ASIC.

The FEB 1140 further comprises an FPGA 1305 (similar to the PCS block of FIG. 8) with a quad Serializer-Deserializer (SerDes) 1310 function. The SerDes 1310 enables transmitting and receiving data between microtiles 1100. Each SerDes lane contains one transmit and one receive channel. In some embodiments, to support video, each channel operates at a minimum of 2.5 Gbps. The transmitters may use 8b/10b encoding, and the receivers may use Clock and Data recovery techniques to decode a serial data stream (e.g. the video signal). The FEB 1140 is further enabled for reliably encoding of video data, as well as embedding control messages within the blanking interval, as described above. The FPGA 1305 is further enabled to support the desired image processing functions.

In the exemplary embodiment, the FPGA 1305 comprises a CPU 1311, and firmware may be stored in flash memory 1142. A single bank of DDR2 SDRAM 1143 may be used as the frame buffer, as well as heap memory storage for the CPU 1311

The output of the FEB 1140 is input to the MLE 1130, as described above. The FEB 1140 is thus further enabled, in the exemplary embodiment, to encode its output video into the Flat Panel Display Link standard for compatibility with the MLE 1130; however the standard used in not particularly limiting. In addition, the 32 bit microprocessor comprises a UART port (not depicted) to control the MLE 1130.

The FEB 1140 may comprises additional connectors for connection to the cooling system 1180, the at least one auto align sensor 1169, the IR sensor 1150, and the power supply 1170.

Attention is now directed to the image processing elements 1320 of the FEB 1140, which processes the output video prior to outputting a signal to the MLE 1130. Processing is generally configured to enable combining of images into tiled applications.

First, a received image is generally stored into a frame buffer portion of SDRAM 1142. This enables the transmitted frame rate to be less than the displayed frame rate, and can further allow for very high resolution images. The frame buffer portion of SDRAM 1142 also enables local scaling and warping. While non-limiting, it is desirable that only the sub-image to be displayed by the microtile unit 1100 be stored in the frame buffer 1330, to keep the size of the frame buffer portion of SDRAM 1142 relatively small.

The image processing elements 1320 are further enabled to rescale the sub-image to match the native resolution of the display engine (i.e. the DMD 1132). While in image tiling applications, only image expansion is generally employed, images can also be downscaled. However, in the exemplary embodiment, downscaling of images generally occurs at the input module 9'.

The image processing elements 1320 are further enabled to geometrically correct scaled images (e.g. warping), for example via 2D keystone corrections, and image rotation. As the MLE 1130 may be a stand alone unit that be installed into an existing microtile 1100, the mechanical tolerances of installing MLE 1130 may cause a projected image to be misaligned with the optical screen 1120. However, using feedback from the auto align sensor(s) 1160, a self alignment system can be implemented to determine the required correction. A non-limiting example of an auto align system is described in applicants co-pending application "Automated Geometry Correction For Rear Projection", U.S. Ser. No. 12/058,260, filed on Mar. 28, 2008 and incorporated herein by reference Scaled images may also be corrected for geometric distortion of the short throw lens 1255, the field lens 1250 and/or the projection optics 1131 (i.e. a pincushion correction or a barrel correction, as known to a person of skill in the art). However, in some embodiments, the short throw lens 1255, the field lens 1250 and/or the projection optics 1131 may be characterized to via a calibration step (e.g. at a factory). With this characterization, distortion can be corrected for in the same circuit as keystone corrections, by adjusting the parameters uploaded by firmware.

The scaling and warping may be combined into a single operation. As this operation tends to result in a softer image, the image processing elements 1320 may also comprise a sharpness filter.

Due to manufacturing tolerances, each individual microtile 1100 may have its own unique colorimetry. The image processing elements 1320 may then further comprise a color correction circuit may enabled to match the primaries and white balance of each microtile 1100 in the array. At the time of manufacture, the color points of each microtile 1100 may be measured, and stored in non-volatile memory. A master processor in the input module 9' may then be enabled to access the colorimetry of each microtile unit 1100 in the array, and calculate a color match point. The color match point can then be transmitted to all the microtile unit 1100s who can set their color points accordingly.

As a microtile 1100 ages, the brightness of the microtile 1100 will generally decrease. A light sensor 1134 may hence be enabled to detect the shifts in brightness on a color by color basis, and the system color correction will be updated accordingly. When the microtile 1100 is part of an array, this enables the array to maintain a uniform appearance as all the microtiles 1100 in the array age, at possible different rates (i.e. the brightness of each microtile 1100 will decrease at different rates).

The image processing elements 1320 may also be enabled to correct for brightness uniformity. In projection systems, uniformity generally drops off parabolically, however the exact nature of the uniformity may vary by projection technology, and the specific parameters of the correction may vary from one microtile 1100 to another. Hence, the uniformity correction function generally depends on the light engine technology selected for the MLE 1130, and on the performance of the optical screen 1120.

In some applications, projected images from the microtiles 1100 in an array will overlap. Hence, in these applications, image processing elements 1320 further comprise an edge blending circuit. The image processing elements 1320 may further comprise a final gamma correction circuit. However, the transfer function in the gamma correction is generally configurable and may be tailored to the chosen display technology.

In some embodiments, the FEB 1140 further comprises a test pattern circuit (not depicted, which resides between the image processing elements 1320 and the output to the MLE 1130. The test pattern circuit is enabled to generate test patterns for projection onto the optical screen 1120 by the MLE 1130, during a calibration process, the test patterns used in conjunction with the auto align sensor(s) 1160 for color matching and geometric calibration.

Non-limiting example of test patterns, include but are not limited to, full drive Red, Green, Blue, White, and/or Black. In some embodiments, the test patterns may only be drawn in the overscan region (i.e. in the location of the auto align sensor(s) 1160), and may comprise arbitrarily sized rectangles. A minimum size of a rectangle may be 1 pixel by 1 pixel. A maximum size of a test pattern may depend on the mechanical/optical design of the microtile 1100. However, a drawn rectangle is generally large enough to ensure that for all mechanical and optical variations, the auto align sensor(s) will be fully illuminated. In some embodiments, the local firmware may be provisioned with test patterns and may further be enabled to control the test patterns and the calibration process.

Returning now to FIG. 11, the IR Sensor 1150 enables use of a user interface, by accepting input from an IR enabled input device, enabled to accept input from a user. In the exemplary embodiments, the carrier frequency for the IR sensor 1150 is 455 kHz (or any other suitable frequency). In contrast, many consumer devices operate at 38 kHz; however this frequency is very susceptible to interference from fluorescent lighting, Many high efficiency ballasts induce a flicker in the lights. While this flicker is far beyond the capacity of human eyes to detect, this flicker can be right at the operating point of the IR sensor 1160, and may overwhelm it with noise if it is operating at 38 kHz. This leads to the microtile 1100 not responding to IR commands or responding intermittently.

Hence, as higher frequency input devices (e.g. remote controls) and IR sensors operate well clear of any interference zones, use of a 455 kHz IR sensor 1150 enables the microtiles 1100 to be used in a wide range of environments.

Each microtile 1100 is further enabled with security provisions to prevent unauthorized personnel from controlling or modifying the setup (e.g. the array and/or the configuration of the microtile 1100, Given that the microtiles 1100 may be installed in public spaces. One non-limiting example of a security provision comprises a password, which may be entered via the OSD.

The power supply 1170 in the embodiment may be enabled to accept any suitable voltage range and frequency, and in the exemplary embodiment a range of 100V to 240V at a frequency of 50 Hz to 60 Hz. As described above, the output of the power supply 1170 is +12V and −12V. All electronics requiring other voltages will generate those voltages locally using DC-DC converters, as described above. However, any other suitable power supply 1170 is within the scope of present embodiments.

The cooling system 1180 is generally enabled to cool the elements of the microtile 1100 which may have degraded performance, or become non-functional if they reach given temperatures. The cooling system 1180 is generally quiet and may be operational only when cooling is required. Indeed some embodiments of the microtile 1100 may not comprise a cooling system at all if it is anticipated that cooling is not required. However, in the exemplary embodiments, the cooling system 1180 comprises a fan controlled by the FEB 1140, for example a 12V fan. The speed of the fan may be controlled based on the cooling requirements and/or an optional temperature sensor (not depicted) for monitoring ambient conditions. In such embodiments, the temperature sensor is in communication with the FEB 1140.

Returning now to the signal harness 5', at the high rates of data transmission used in video signals, there may be a high probability of cross talk. Cross talk refers to the coupling of electromagnetic fields between adjacent conductors in a harness. Hence, when cross talk occurs in the signal harness 5', one of the signals passing through the signal harness 5' may be corrupted by one or more of the neighboring signals. If this occurs, it will result in noisy video. In an extreme case synchronization may be lost, resulting in a jumping video image. Hence, in some embodiments, the signal harness 5' may be enabled to combat cross talk by individually shielding the conductors with a grounded conductive shield. This will contain the EM fields to within the field, and prevent any coupling and hence cross talk.

A second concern in the signal harness 5' is EMI. Although a single microtile 1100 may have a low level of emissions, when a large number of microtiles 1100 are combined into an array (e.g. as in FIG. 9), the aggregate EMI may be substantial. Harnesses such as the signal harness 5', especially external harnesses, are inherently structured like antennas, and are the most likely source of EMI. Hence, the signal harness 5' may be enabled to EMI radiation from the harness occurs, by shielding the signal harness 5'.

A third concern in the signal harness 5' is consistency of impedance in the cable which makes up the signal harness 5' and through which data signals are transmitted. However, variations in the quality of the cable may lead to inconsistent impedance and degradation of the data signal quality including unbalanced performance of the differential signal. For example, if twisted pair is used, a percentage of cables may have a lower number of twists per inch. Given that the array is daisy chained, a failure in the signaling will propagate through the entire array. Hence, at least one of the elements in an array (e.g. a microtile 110 and/or an input unit 9') may be enabled with error checking techniques to assist in isolating a bad cable.

A fourth concern in the signal harness 5' is crossover. In a straight through cable, the wiring is one-to-one, wherein pin 1 at one end is connected to pin 1 at the other end, pin 2 at one end is connected to pin 2 at the other end, etc. In a crossover cable, pin 1 of one end of the cable can, for example, be connected to pin 2 at the opposite end, and pin 2 can be connected to pin 1, such that outputs are directly connected to inputs, and if made symmetrical, the cable can be plugged in either way. In such a configuration, the output of one microtile 1100 can be connected to the input to another unit (i.e. signal ports 920 are connected). Hence, in some embodiments, this can be addressed by having one signal port 920 be a dedicated input port and a second signal port 920 be a dedicated output port, and/or by having a crossover built into the cable of the signal harness 5'.

In some embodiments, the signal harness 5' comprises crossover CAT6 cables, however any other suitable cable is within the scope of present embodiments.

The signal routing scheme of the input module 9' may be similar to the signal routing scheme of the FEB 1130, depicted in FIG. 13, for example in a video routing and processing module, similar to the video routing and processing module depicted in FIG. 7. However, as depicted in FIG. 13, the input module 9' includes the at least one data input port 930, coupled to an input processing module 1360.

In the exemplary embodiment, the output of the input module 9' will be 24 bit RGB progressive scan video, with HSync, VSync, and ActData timing strobes. If the source video is interlaced it shall be converted to progressive by the input module 9', e.g. via the input processing module 1360. If the source is YPrPb encoded, it will be converted to RGB.

In some embodiments, when arrays are used to display broadcast, the input module 9' may be enabled to operate in a frame locked mode by default. In these applications, the image will be filmed at a set video rate (50 Hz PAL or 59.94 Hz NTSC). It is desirable that the microtiles 1' in the array operate at the same rate to avoid artifacts. If the MLE 1130 can not support the input frame rate, frame rate conversion may be performed via, for example, frame insertion/deletion. It is desirable, though non-limiting, that an integer multiple or divisor of the input frame rate be used. If there are no supported integer multiples or divisors available, the minimum frame rate of the MLE 1130 may be used.

What is claimed is:

1. An imaging system comprising,
   a plurality of image sources, each image source for distributing a respective image; and
   a plurality of microtile units in communication with each other and said plurality of image sources, each of said plurality of microtile units comprising at least one coupling mechanism for coupling to at least one other microtile unit such that the plurality of microtile units may be physically coupled together in a geometric configuration, and each of the plurality of microtiles enabled to receive at least one image from said plurality of image sources, and generate respective portions of said at least one image, a first subset of said plurality of microtiles enabled to display a first image received from a first image source and at least a second subset of said plurality of microtiles enabled to display at least a second image received from at least a second image source,
wherein one of said plurality of image sources is designated as a system master, said system master enabled to control distribution of said first image and said at least said second image to said first subset and said at least said second subset, respectively.

2. The imaging system of claim 1, wherein said system master is further enabled to control distribution of said first image and said at least said second image to said first subset and said at least said second subset, respectively, by transmitting command signals to each of said plurality of microtiles, said command signals indicative of a respective portion of said at least one image that is to be generated at each said microtile.

3. The imaging system of claim 2, wherein each said microtile is enabled to generate respective portions of said at least one image by selecting said respective portion of said at least one image based on said command signals.

4. The imaging system of claim 1, said system master further enabled for automatically detecting a geometrical configuration of said plurality of microtile units.

5. The imaging system of claim 1, wherein each said microtile is enabled to: determine if a received image is an image for display; and if so, generate respective portions of said received image, and if not, transmit said received image to at least one other microtile of the plurality of microtiles.

6. The imaging system of claim 1, wherein a first microtile in a given subset is enabled to generate a first portion of an image for display and transmit said image for display to another microtile in said given subset, and a last microtile in said given subset is enabled to generate a last portion of said image for display, and determine if said image for display is to be transmitted to another microtile external to said given subset.

7. The imaging system of claim 1, wherein microtiles in a given subset between said first microtile and said last microtile are enabled to generate a portion of said image for display and transmit said image for display to a next microtile in said given subset.

8. The imaging system of claim 1, wherein each said microtile comprises circuitry enabled for communication with other microtile units in said plurality of microtiles and said plurality of imaging sources, said circuitry further enabled to generate respective portions of said at least one image.

9. The imaging system of claim 8, wherein said circuitry includes a plurality of signal ports for interconnection between respective microtile units via respective communication lines.

10. The imaging system of claim 9, wherein said communication lines include at least one of lines for data transmission, lines for communications, and lines for power transmission.

11. The imaging system of claim 8, wherein said circuitry includes a microprocessor, frame buffer and video processing to provide at least one of image capture, resizing, color matching, edge blending and geometric correction of said image.

12. The imaging system of claim 8, wherein said circuitry for communication includes circuitry for encoding and decoding command messages respectively into and out of video signals representing images.

13. The imaging system of claim 1, wherein each of said microtile units includes circuitry for edge blending said image across adjacent ones of said plurality of microtile units.

14. The imaging system of claim 1, wherein each of said microtile units includes a light engine enabled to generate respective portions of said at least one image.

15. The imaging system of claim 1, wherein at least one image source includes a source of power for providing power to respective ones of said microtile units.

16. The imaging system of claim 1, wherein said image source provides video processing, including at least one of de-interlacing, scaling, and frame rate conversion.

17. The imaging system of claim 1, wherein said at least one coupling mechanism comprises complementary male portions and female portions.

18. The imaging system of claim 17, wherein said male portions and female portions are generally tubular and include complementary threads.

19. The imaging system of claim 1, wherein said at least one coupling mechanism comprises complementary shaped protrusions and indentations on respective surfaces of said microtile units to permit registration and alignment of said microtile units.

20. The imaging system of claim 1, wherein said at least one coupling mechanism enables each of said microtile units to be coupled to at least one other microtile unit horizontally.

21. The imaging system of claim 1, wherein said at least one coupling mechanism enables each of said microtile units to be coupled to at least one other microtile unit vertically.

22. The imaging system of claim 1, wherein each of said microtile units includes a self-contained screen and a rear projector for projecting said portion of said image on said screen.

23. The imaging system of claim 1, wherein each microtile unit includes a projector for projecting said respective portions of said image onto a remote screen.

24. The imaging system of claim 1, wherein each of said image sources, and each of said microtile units includes a video routing and processing module for receiving, transmitting and operating on video and command signals in accordance with its associated functionality as image source and microtile unit respectively.

25. An image source comprising,
at least one signal port for distributing a video signal representing images to a plurality of microtile units for generating respective portions of said images, and transmitting and receiving command signals; and
a processing unit enabled for inserting said command signals into, and extracting said command signals from, said video signal, said command signals for detecting a geometrical configuration of said plurality of microtile units in a self organization process,
wherein said processor is further enabled to implement an arbitration scheme if a second image source is encountered during said self-organization process, said second image source implementing a similar self organization process, such that one of the image source and said second image source is designated as a system master, and the self-organization process of the system master takes precedence.

26. The image source of claim 25, wherein said command signals are enabled to trigger, for each respective one of said microtile units, detecting the presence of any other microtile unit to one side of said one of said microtile units and detecting the presence of any other microtile unit to another side of said one of said microtile adjacent said one side; said processing unit further enabled for creating a map of said one of said geometrical configurations based on detection of said presence.

27. The image source of claim 26, wherein said command signals are further enabled to trigger each respective one of said microtile units to generate a respective portion of said at least one image by selecting said respective portion of said at least one image based on said map.

28. The image source of claim 27, said processor further enabled to determine if at least a second image source is distributing at least a second video signal representing at least second images to said plurality of microtile units for generating respective portions of said at least said second images, and further enabled to determine a first subset of said plurality of microtiles for displaying said images and at least a second subset of said plurality of microtiles for displaying said at least said second images.

29. The image source of claim 28, wherein said command signals are further enabled to trigger generating respective portions of said images at said first subset, and trigger generating respective portions of said at least said second images at said second subset.

30. The image source of claim 25, further comprising a memory for storing said images, and said processor further enabled to retrieve said images and generate said video signal representing said images.

31. The image source of claim 25, further comprising at least one data input for receiving said images from an external image source, said processing unit further enabled to generate said video signal representing said images.

32. The image source of claim 25, further comprising a source of power for providing power to respective ones of said microtile units.

33. The image source of claim 25, wherein said image source provides video processing, including at least one of de-interlacing, scaling, and frame rate conversion.

34. The image source of claim 25, further comprising a video routing and processing module for receiving, transmitting and operating on video and command signals in accordance with its associated functionality.

35. A microtile unit, comprising:
at least one coupling mechanism for connection to a plurality of other microtile units such that said microtile units may be arranged in multiple geometrical configurations;
at least one signal port for interconnection between respective microtile units via respective communication lines, and for receiving at least one video signal representing images from at least one of a plurality of image sources;
circuitry enabled for communication with other microtile units in said plurality of microtiles and said plurality of image sources; and
a light engine in communication with said processing unit for generating a respective portion of said images,
wherein one of said plurality of image sources is designated as a system master, said system master enabled to control distribution of a first image from a first image source and at least a second image from at least a second image source to a first subset of said microtiles and at least a second subset of said microtiles, respectively.

36. The microtile unit of claim 35, wherein said circuitry includes a microprocessor, frame buffer and video processing to provide at least one of image capture, resizing, color matching, edge blending and geometric correction of said images.

37. The microtile unit of claim 35, wherein said circuitry includes circuitry for encoding and decoding command messages respectively into and out of video signals representing images.

38. The microtile unit of claim 35, wherein said circuitry includes circuitry for edge blending said images across adjacent ones of said plurality of microtile units.

39. The microtile unit of claim 35, wherein said circuitry is further enabled for detecting the presence of any other microtile unit to one side of the microtile unit and detecting the presence of any other microtile unit to another side of the microtile unit adjacent said one side, such that a map of said geometrical configuration can be created based on detection of said presence.

40. The microtile unit of claim 39, wherein said circuitry is further enabled to transmit data associated with said detection of said presence to a system master device for creation of said map at said system master device.

41. The microtile unit of claim 40, wherein said detecting includes generating a signal at said one side and a signal at said another side for detection by said any other microtile unit.

42. The microtile unit of claim 41, further comprising an LED and photodetector, wherein said signal is generated by said LED and detected by said photodetector at said any other microtile unit.

43. The microtile unit of claim 39, wherein said one side comprises one of either a top side or a bottom side and said another side comprises one of a left side or a right side.

44. The microtile unit of claim 39, wherein said detecting the presence of any other microtile unit further comprises detecting the presence of any other microtile unit to a further side of said one of said microtile units parallel to said one side and detecting the presence of any other microtile unit to an additional side of said one of said microtile parallel to said another side.

45. The microtile unit of claim 35, wherein said at least one coupling mechanism comprises complementary male portions and female portions.

46. The microtile unit of claim 45, wherein said male portions and female portions are generally tubular and include complementary threads.

47. The microtile unit of claim 35, wherein said at least one coupling mechanism comprises complementary shaped protrusions and indentations on respective surfaces of said microtile units to permit registration and alignment of said microtile units.

48. The microtile unit of claim 35, wherein said at least one coupling mechanism enables each of said microtile units to be coupled to at least one other microtile unit horizontally.

49. The microtile unit of claim 35, wherein said at least one coupling mechanism enables each of said microtile units to be coupled to at least one other microtile unit vertically.

50. The microtile unit of claim 49, further comprising a self-contained screen and said light engine comprises a rear projector for projecting said portion of said image on said screen.

51. The microtile unit of claim 35, said at least one signal port further enabled for transmitting said at least one video signal to at least one other microtile unit.

* * * * *